US012589741B2

(12) United States Patent (10) Patent No.: US 12,589,741 B2

Iwase et al. (45) Date of Patent: Mar. 31, 2026

(54) DRIVE ASSIST APPARATUS FOR VEHICLE AND DRIVE ASSIST SYSTEM FOR VEHICLE

(71) Applicant: SUBARU CORPORATION, Tokyo (JP)

(72) Inventors: Takuya Iwase, Tokyo (JP); Kazuaki Ueda, Tokyo (JP); Shingo Ugajin, Tokyo (JP); Toshihiro Hayashi, Tokyo (JP); Kazuo Nomoto, Tokyo (JP); Hiroto Kobayashi, Tokyo (JP); Takumi Funabashi, Tokyo (JP); Kenta Someya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 228 days.

(21) Appl. No.: 18/124,378

(22) Filed: Mar. 21, 2023

(65) Prior Publication Data

US 2023/0311864 A1 Oct. 5, 2023

(30) Foreign Application Priority Data

Mar. 31, 2022 (JP) ................................. 2022-060192

(51) Int. Cl.
*B60W 30/095* (2012.01)
*B60W 30/09* (2012.01)
*B60W 40/09* (2012.01)

(52) U.S. Cl.
CPC ........ *B60W 30/0956* (2013.01); *B60W 30/09* (2013.01); *B60W 40/09* (2013.01); *B60W 2554/404* (2020.02); *B60W 2556/10* (2020.02)

(58) Field of Classification Search
CPC .. B60W 30/0956; B60W 30/09; B60W 40/09; B60W 2554/404; B60W 2556/10;
(Continued)

(56) References Cited

U.S. PATENT DOCUMENTS

2022/0092982 A1 3/2022 Bader
2022/0208008 A1* 6/2022 Matsuoka ............. B60W 50/14
(Continued)

FOREIGN PATENT DOCUMENTS

CN 102013174 A 4/2011
JP 2006-323766 A 11/2006
(Continued)

OTHER PUBLICATIONS

Zenzerovic, Paolo, and Zlatan Car. "Vehicle beam light assistant system." Annals of DAAAM & Proceedings (2011): 1653-1655. (Year: 2011).*
(Continued)

*Primary Examiner* — Russell Frejd
*Assistant Examiner* — Ana D Thomas
(74) *Attorney, Agent, or Firm* — TROUTMAN PEPPER LOCKE LLP

(57) ABSTRACT

A drive assist apparatus for a vehicle includes one or more processors configured to: obtain a risk degree calculated for an oncoming moving body moving with a velocity component in a direction opposite to a traveling direction of the vehicle in the oncoming moving body on an oncoming lane adjoining a traveling lane of the vehicle, based on a light emission pattern of a light source unit provided in the oncoming moving body; perform, upon determining that the vehicle is highly likely to come into collision with an obstacle, emergency collision avoidance control for avoiding the collision; and recognize the oncoming moving body as the obstacle according to the risk degree and perform, prior to the emergency collision avoidance control, preliminary collision avoidance control for the oncoming moving body.

19 Claims, 20 Drawing Sheets

(58) Field of Classification Search
CPC ..... B60W 2552/53; B60W 2554/4044; B60W
2554/806; B60W 10/06; B60W 10/10;
B60W 10/184; B60W 10/20; B60W
50/14; G06V 20/584; B60T 8/3275; B60T
7/12; B60T 8/171; B60T 13/662; B60T
17/22; B60T 7/122; B60T 2201/06
See application file for complete search history.

(56) References Cited

U.S. PATENT DOCUMENTS

| | | | | |
|---|---|---|---|---|
| 2022/0258730 A1* | 8/2022 | Morotomi | ......... | B60W 30/0953 |
| 2023/0106686 A1* | 4/2023 | Nguyen Van | ......... | B60W 30/09 |
| | | | | 701/26 |

FOREIGN PATENT DOCUMENTS

| | | | |
|---|---|---|---|
| JP | 2009-116693 A | 5/2009 |
| JP | 2015-162005 A | 9/2015 |
| JP | 2016-224501 A | 12/2016 |

OTHER PUBLICATIONS

Office Action issued in Japanese Patent Application No. 2022-060192 dated Oct. 28, 2025 (including machine translation).

* cited by examiner

FIG. 11

| TIME POINT t-2 STATE | TIME POINT t-2 RISK DEGREE INTERMEDIATE VALUE | TIME POINT t-1 STATE | TIME POINT t-1 RISK DEGREE INTERMEDIATE VALUE | TIME POINT t STATE | TIME POINT t RISK DEGREE INTERMEDIATE VALUE | TOTAL RISK VALUE | TRACK PATTERN |
|---|---|---|---|---|---|---|---|
| CLOSER TO VEHICLE | 3 | CLOSER TO VEHICLE | 3 | CLOSER TO VEHICLE | 3 | 9 | 1 |
| | | | | CLOSER TO CENTER | 1 | 7 | 2 |
| | | | | CLOSER TO OPPOSITE OF VEHICLE | -1 | 5 | 3 |
| | | CLOSER TO CENTER | 1 | CLOSER TO VEHICLE | 3 | 7 | 4 |
| | | | | CLOSER TO CENTER | 1 | 5 | 5 |
| | | | | CLOSER TO OPPOSITE OF VEHICLE | -2 | 2 | 6 |
| | | CLOSER TO OPPOSITE OF VEHICLE | -1 | CLOSER TO VEHICLE | 3 | 5 | 7 |
| | | | | CLOSER TO CENTER | 0 | 2 | 8 |
| | | | | CLOSER TO OPPOSITE OF VEHICLE | -1 | 1 | 9 |
| CLOSER TO CENTER | 0 | CLOSER TO VEHICLE | 3 | CLOSER TO VEHICLE | 3 | 6 | 10 |
| | | | | CLOSER TO CENTER | 1 | 4 | 11 |
| | | | | CLOSER TO OPPOSITE OF VEHICLE | -1 | 2 | 12 |
| | | CLOSER TO CENTER | 0 | CLOSER TO VEHICLE | 3 | 3 | 13 |
| | | | | CLOSER TO CENTER | 0 | 0 | 14 |
| | | | | CLOSER TO OPPOSITE OF VEHICLE | 1 | 1 | 15 |
| | | CLOSER TO OPPOSITE OF VEHICLE | 1 | CLOSER TO VEHICLE | 1 | 2 | 16 |
| | | | | CLOSER TO CENTER | 0 | 1 | 17 |
| | | | | CLOSER TO OPPOSITE OF VEHICLE | 3 | 4 | 18 |
| CLOSER TO OPPOSITE OF VEHICLE | 1 | CLOSER TO VEHICLE | 1 | CLOSER TO VEHICLE | 3 | 5 | 19 |
| | | | | CLOSER TO CENTER | 0 | 2 | 20 |
| | | | | CLOSER TO OPPOSITE OF VEHICLE | 1 | 3 | 21 |
| | | CLOSER TO CENTER | 0 | CLOSER TO VEHICLE | 1 | 2 | 22 |
| | | | | CLOSER TO CENTER | 1 | 1 | 23 |
| | | | | CLOSER TO OPPOSITE OF VEHICLE | 0 | 4 | 24 |
| | | CLOSER TO OPPOSITE OF VEHICLE | 3 | CLOSER TO VEHICLE | 3 | 3 | 25 |
| | | | | CLOSER TO CENTER | -1 | 5 | 26 |
| | | | | CLOSER TO OPPOSITE OF VEHICLE | 1 | 7 | 27 |

FIG. 13

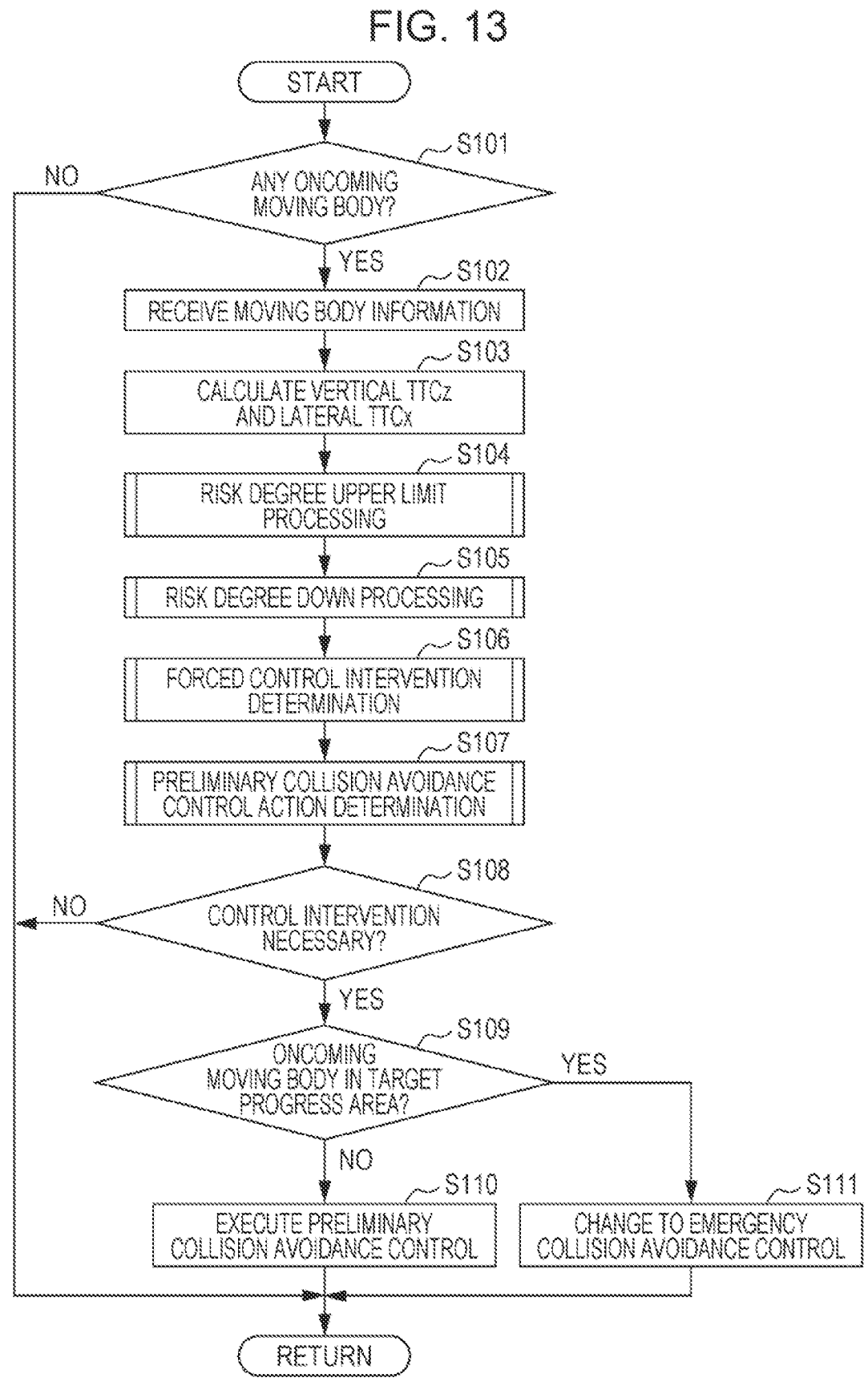

START

S101 — ANY ONCOMING MOVING BODY?

NO

YES — S102 — RECEIVE MOVING BODY INFORMATION

S103 — CALCULATE VERTICAL TTCz AND LATERAL TTCx

S104 — RISK DEGREE UPPER LIMIT PROCESSING

S105 — RISK DEGREE DOWN PROCESSING

S106 — FORCED CONTROL INTERVENTION DETERMINATION

S107 — PRELIMINARY COLLISION AVOIDANCE CONTROL ACTION DETERMINATION

S108 — CONTROL INTERVENTION NECESSARY?

NO

YES — S109 — ONCOMING MOVING BODY IN TARGET PROGRESS AREA?

YES

NO — S110 — EXECUTE PRELIMINARY COLLISION AVOIDANCE CONTROL

S111 — CHANGE TO EMERGENCY COLLISION AVOIDANCE CONTROL

RETURN

FIG. 20

| RISK LEVEL (RISK DEGREE) | REPORT NECESSARY | VERTICAL AVOIDANCE | LATERAL AVOIDANCE | STEERING WHEEL STEERING SPEED |
|---|---|---|---|---|
| LV = 3 (4 < R) | YES | PRIMARY DECELERATION BRAKE (0.4G) | PERFORM AVOIDANCE WHEN ONCOMING MOVING BODY CROSSES LANE | HIGH SPEED (e.g. 180 deg/s) |
| LV = 2 (2 < R) | YES | ACCELERATION SUPPRESSED (RELEASE ACCELERATOR TO DECELERATE) | PERFORM AVOIDANCE WHEN ONCOMING MOVING BODY STRIDES OVER LANE | MEDIUM SPEED (e.g. 80 deg/s) |
| LV = 1 (0 < R) | NO | ACCELERATION SUPPRESSED (CRITICAL ACCELERATION SUPPRESSED) | PERFORM AVOIDANCE WHEN ONCOMING MOVING BODY IS WITHIN SAME LANE | LOW SPEED (e.g. 10 deg/s) |
| LV = 0 (R = 0) | NO | – | – | – |

DRIVE ASSIST APPARATUS FOR VEHICLE AND DRIVE ASSIST SYSTEM FOR VEHICLE

CROSS-REFERENCE TO RELATED APPLICATION

The present application claims priority from Japanese Patent Application No. 2022-060192 filed on Mar. 31, 2022, the entire contents of which are hereby incorporated by reference.

BACKGROUND

The disclosure relates to a drive assist apparatus for a vehicle and a drive assist system for a vehicle, with a function of performing control to avoid a collision with an obstacle.

Hitherto, for vehicles such as automobiles, drive assist apparatuses configured to assist the driver's driving operations have been put into practical use with the aim of reducing the burden on the driver's driving operations and improving safety. This type of drive assist apparatus sets the following driving modes, for example: a manual driving mode in which steering and acceleration/deceleration are performed according to the driver's independent driving operations; a drive assist mode in which steering assist control and acceleration/deceleration control are performed on the premise of the driver's independent driving operations; and a drive assist mode for causing the vehicle to travel without requiring the driver's driving operations (so-called "autonomous driving mode").

Drive assist control in each drive assist mode is basically realized by having the adaptive cruise control (ACC) function, the active lane keep centering (ALKC) function, and the like. With such drive assist control, the vehicle is caused to travel along the traveling lane while keeping the distance from the preceding vehicle.

In addition, various technologies for performing control to avoid a collision with an obstacle that is present ahead in the vehicle's course have been proposed as technologies related to active safety of the drive assist apparatus (for example, see Japanese Unexamined Patent Application Publication (JP-A) No. 2016-224501). In the technology discussed in JP-A No. 2016-224501, a collision predictor is configured to identify an obstacle's collision-assumed area from the vehicle's traveling track (target course) and the obstacle's position, shape, moving direction, and the like. The collision predictor is also configured to integrate a probability value of collision with the obstacle in the collision-assumed area. Then, when the integrated value of the collision probability value increases in any of one or more collision-assumed areas identified at plural points, a collision determiner is configured to generate a warning signal.

SUMMARY

An aspect of the disclosure provides a drive assist apparatus for a vehicle. The drive assist apparatus includes one or more processors, and one or more memories storing instructions that, when executed, cause the one or more processors to: obtain a risk degree for an oncoming moving body calculated in the oncoming moving body, based on a light emission pattern of a light source unit provided in the oncoming moving body, the oncoming moving body moving with a velocity component in a direction opposite to a traveling direction of the vehicle, on an oncoming lane adjoining a traveling lane of the vehicle; perform, upon determining that the vehicle is highly likely to come into collision with an obstacle, emergency collision avoidance control for avoiding the collision; and recognize the oncoming moving body as the obstacle according to the risk degree, and perform, prior to the emergency collision avoidance control, preliminary collision avoidance control for the oncoming moving body recognized as the obstacle.

An aspect of the disclosure provides A drive assist apparatus for a vehicle. The drive assist apparatus including: one or more processors; and one or more memories storing instructions that, when executed, cause the one or more processors to calculate a risk degree of the vehicle on a surrounding vehicle based on one or both of a history of a behavior of the vehicle with respect to a section line dividing a traveling lane of the vehicle and a behavior of a driver who is driving the vehicle; and a light source unit including a light source and configured to emit light toward surroundings of the vehicle, the light having a light emission pattern set in advance according to the risk degree.

An aspect of the disclosure provides A drive assist apparatus for a vehicle. The drive assist apparatus including: one or more processors; and one or more memories storing instructions that, when executed, cause the one or more processors to calculate a risk degree of the vehicle on a surrounding vehicle based on one or both of a history of a behavior of the vehicle with respect to a section line dividing a traveling lane of the vehicle and a behavior of a driver who is driving the vehicle; and a light source unit including a light source and configured to emit light toward surroundings of the vehicle, the light having a light emission pattern set in advance according to the risk degree.

The instructions are configured to cause the one or more processors further to: obtain a risk degree for an oncoming moving body calculated in the oncoming moving body, based on a light emission pattern of a light source unit provided in the oncoming moving body, the oncoming moving body moving with a velocity component in a direction opposite to a traveling direction of the vehicle, on an oncoming lane adjoining the traveling lane of the vehicle; perform, upon determining that the vehicle is highly likely to come into collision with an obstacle, emergency collision avoidance control for avoiding the collision; and recognize the oncoming moving body as the obstacle according to the risk degree and to perform, prior to the emergency collision avoidance control, preliminary collision avoidance control for the oncoming moving body recognized as the obstacle.

An aspect of the disclosure provides A drive assist apparatus for a vehicle. The drive assist apparatus including: a risk degree calculator provided in an oncoming moving body that moves with a velocity component in a direction opposite to a traveling direction of the vehicle on an oncoming lane adjoining a traveling lane of the vehicle and configured to calculate a risk degree of the oncoming moving body on a surrounding vehicle based on one or both of a history of a behavior of the oncoming moving body with respect to a section line dividing the oncoming lane and a behavior of a driver who is driving the oncoming moving body; a light source unit provided in the oncoming moving body and configured to emit light toward surroundings of the oncoming moving body, the light having a light emission pattern set in advance according to the risk degree; a risk degree obtainer provided in the vehicle and configured to obtain the risk degree of the oncoming moving body based on the light emission pattern of the light source unit; an emergency collision avoidance controller provided in the vehicle and configured to, upon determining that the vehicle is likely to collide with an obstacle, perform emergency collision avoidance control for avoiding the collision; and a preliminary collision avoidance controller provided in the vehicle and configured to recognize the oncoming moving body as the obstacle according to the risk degree and to perform, prior to the emergency collision avoidance control, preliminary collision avoidance control for the oncoming moving body recognized as the obstacle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 11 is an explanatory diagram illustrating a risk determination map;

FIG. 13 is a flowchart illustrating a preliminary collision avoidance control routine;

FIG. 20 is an explanatory diagram illustrating the control details of preliminary collision avoidance control.

DETAILED DESCRIPTION

An oncoming vehicle or the like traveling in an oncoming lane adjacent to a vehicle's traveling lane is basically present at a position separated, in the vehicle width direction, from the vehicle's target course. Therefore, the oncoming vehicle or the like may not be subjected to collision avoidance control. In this case, for example, when the oncoming vehicle or the like suddenly enters the vehicle's traveling lane due to, for example, the carelessness of a driver who is driving the oncoming vehicle or the like, it may be difficult to realize sufficient collision avoidance control for the oncoming vehicle.

It is desirable to provide a drive assist apparatus for a vehicle and a drive assist system for a vehicle, capable of securing sufficient safety even in the case where an oncoming vehicle or the like suddenly enters the vehicle's traveling lane.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, quantities and positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
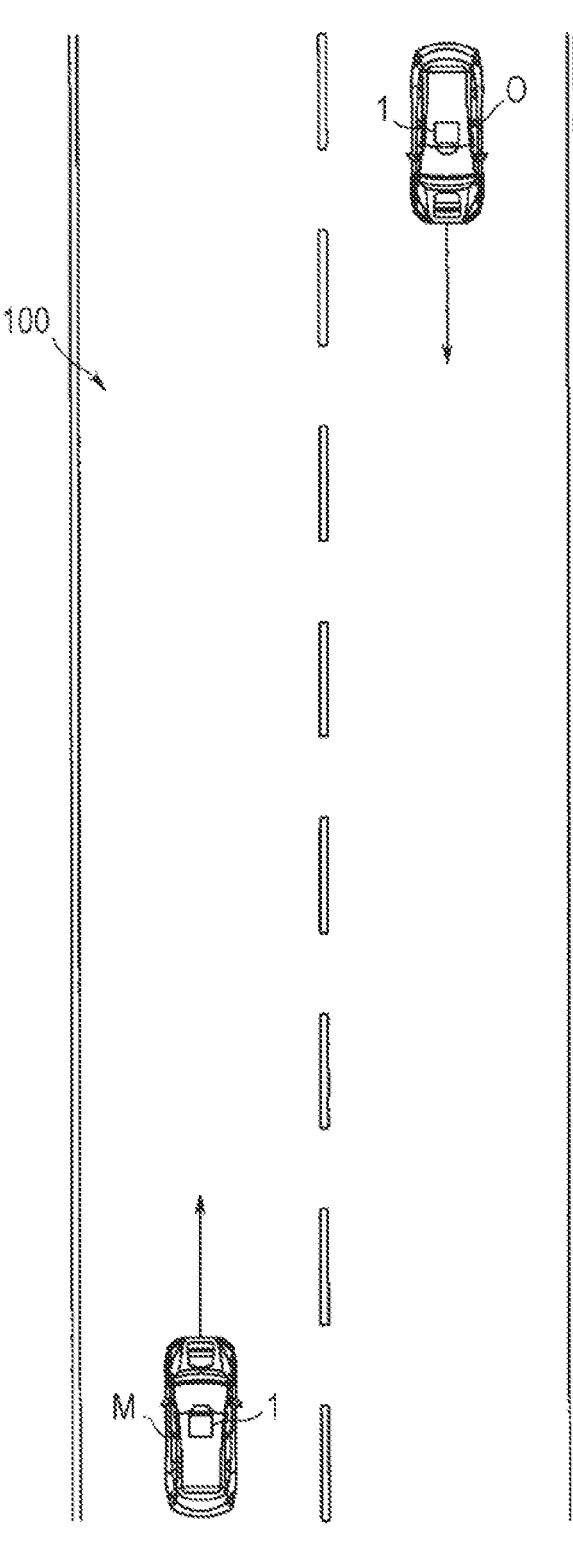
FIG. 1 is a schematic diagram of a drive assist system.

Referring to FIG. 1, a drive assist system 100 of the present embodiment includes a vehicle M and an oncoming vehicle (oncoming moving body O) as vehicles capable of performing wireless communication with each other.

The vehicle M and the oncoming moving body O are each equipped with a drive assist apparatus 1.

Figure 2:
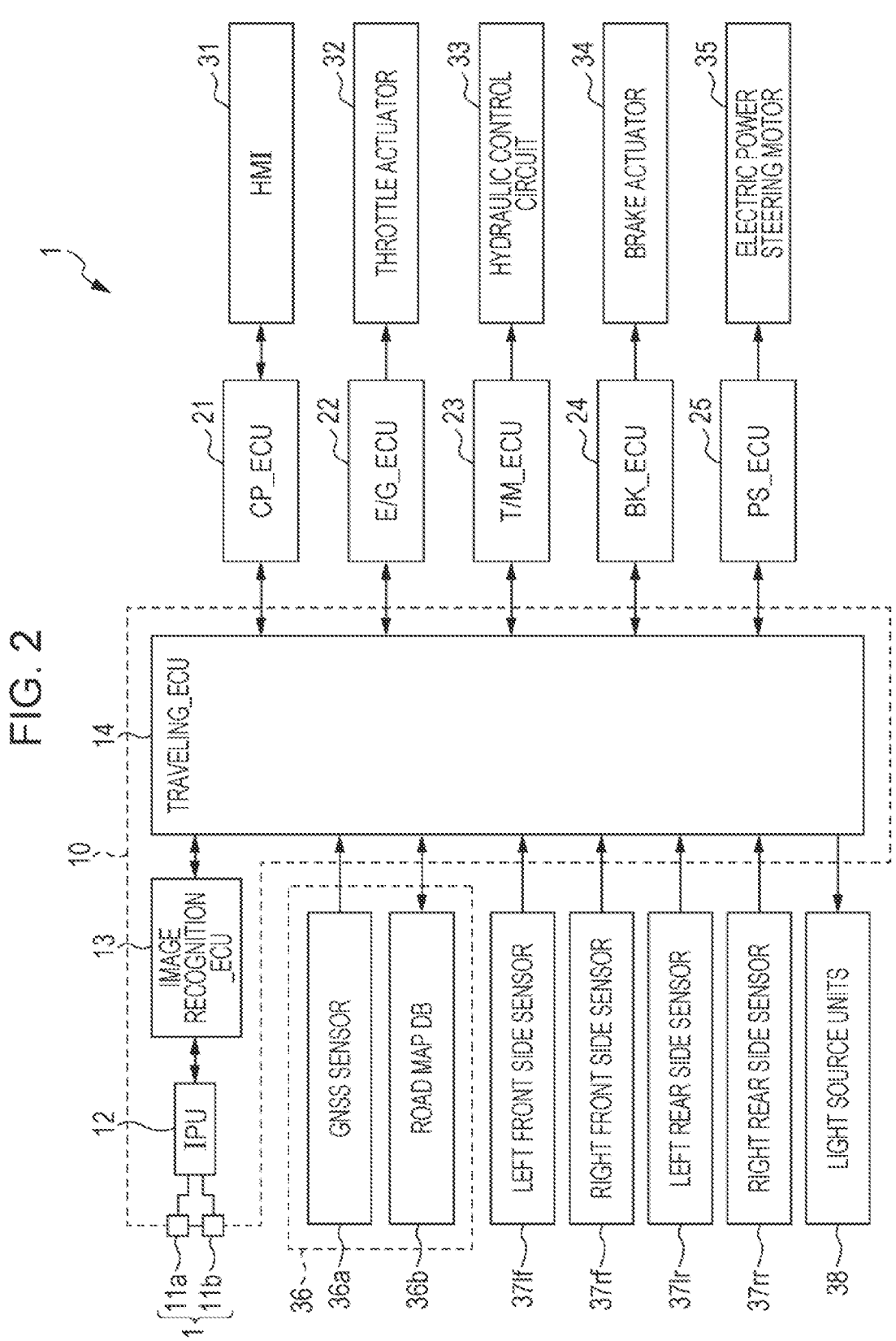
FIG. 2 is a schematic diagram of a drive assist apparatus.
Figure 3:
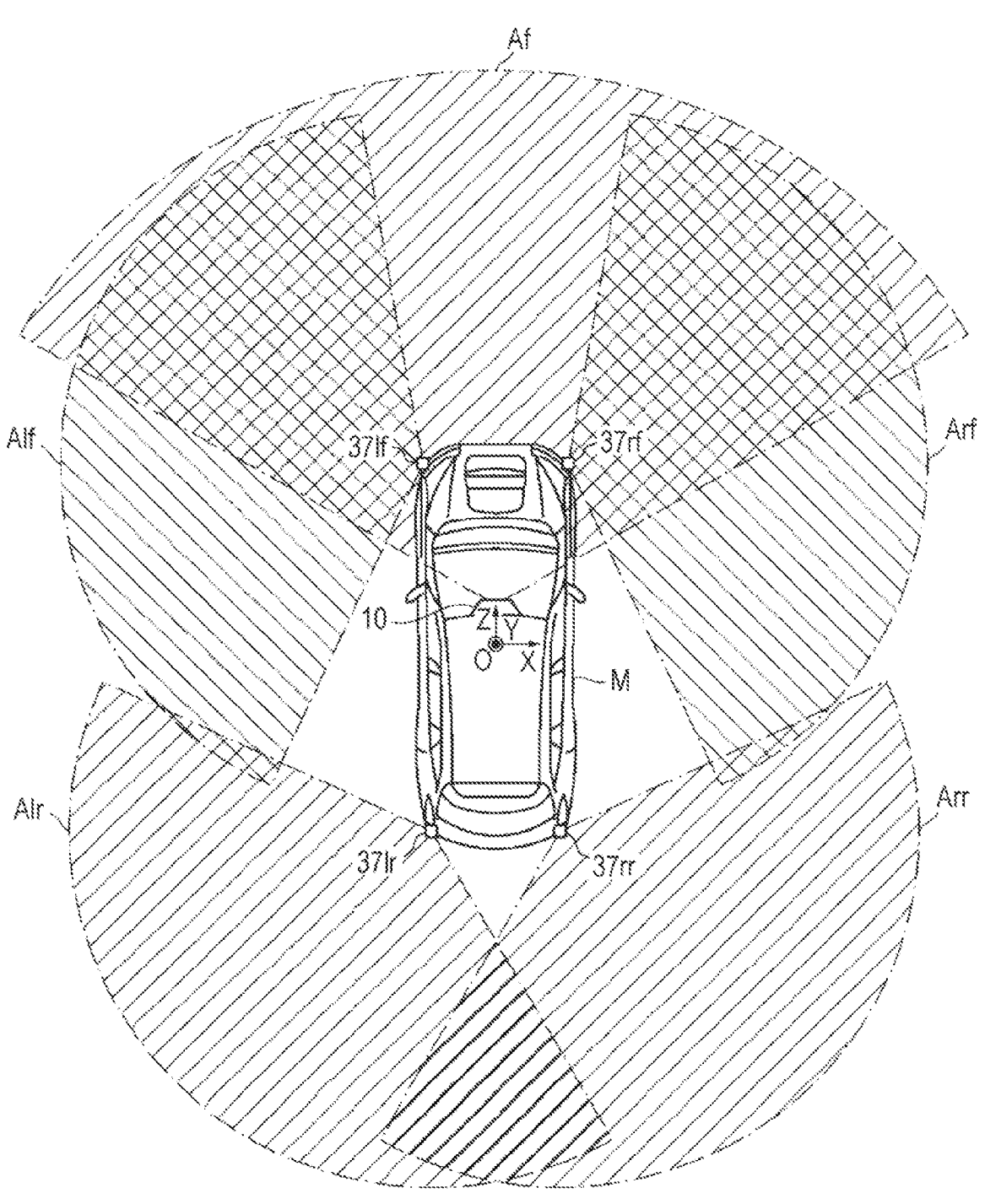
FIG. 3 is an explanatory diagram illustrating the monitoring areas of stereo cameras and radars.

Next, the configuration of the drive assist apparatus 1 mounted on the vehicle M will be described with reference to FIGS. 2 and 3. The drive assist apparatus 1 is configured including, for example, a camera unit 10 fixed at the front and upper center of the cabin of the vehicle M.

The camera unit 10 includes stereo cameras 11, an image processing unit (IPU) 12, an image recognition unit (image recognition_electronic control unit (ECU)) 13, and a traveling control unit (traveling_ECU) 14.

The stereo cameras 11 include a main camera 11*a* and a sub-camera 11*b*. The main camera 11*a* and the sub-camera 11*b* are composed of, for example, complementary metal-oxide semiconductor (CMOS) or the like. The main camera 11*a* and sub-camera 11*b* are disposed at symmetrical positions across the center in the vehicle width direction.

The main camera 11*a* and the sub-camera 11*b* perform stereo imaging of the traveling environment in an area Af (see FIG. 3) ahead outside the vehicle M from different viewpoints. The imaging cycles of the main camera 11*a* and the sub-camera 11*b* are synchronized with each other.

The IPU 12 applies certain image processing to driving environment images imaged by the stereo cameras 11. In doing so, the IPU 12 detects the edge of various targets such as three-dimensional objects and section lines on the road surface that are represented on the images. Then, the IPU 12 obtains distance information from a positional shift amount between corresponding edges on the left and right images. In doing so, the IPU 12 generates image information including the distance information (distance image information).

Based on the distance image information received from the IPU 12, the image recognition_ECU 13 obtains the road curvatures [1/m] of section lines dividing the left and right of the lane (vehicle course) in which the vehicle M travels, and the width (lane width) between the left and right section lines. In addition, the image recognition_ECU 13 also obtains the road curvatures of section lines dividing the left and right of a lane adjacent to the lane in which the vehicle M travels and the width between the left and right section lines. Various methods for obtaining the road curvatures and the lane width are known. For example, the image recognition_ECU 13 applies binary processing based on luminance to each pixel of the distance image. In doing so, the image recognition_ECU 13 extracts section line candidate points on the road. In addition, the image recognition_ECU 13 applies curve approximation using the least-squares method, for example, to a point sequence of the extracted section line candidate points. In doing so, the image recognition_ECU 13 obtains the curvatures of the left and right section lines for each certain section. Furthermore, the image recognition_ECU 13 calculates the lane width from the difference between the curvatures of the left and right section lines.

Based on the curvatures of the left and right section lines and the lane width, the image recognition_ECU 13 calculates the lane center, the vehicle's lateral position deviation, and the like. Here, the vehicle's lateral position deviation is the distance from the lane center to the center of the vehicle M in the vehicle width direction.

In addition, the image recognition_ECU 13 applies certain pattern matching to the distance image information. In doing so, the image recognition_ECU 13 recognizes three-dimensional objects, such as guardrails, curbs, and median strips extending along the road, and surrounding vehicles. Here, in the recognition of a three-dimensional object by the image recognition_ECU 13, for example, the type of the three-dimensional object, the distance to the three-dimensional object, the velocity of the three-dimensional object, and the relative velocity between the three-dimensional object and the vehicle M are recognized.

These various types of information recognized by the image recognition_ECU 13 are output as traveling environment information to the traveling_ECU 14.

Furthermore, in the case where the recognized three-dimensional object is a moving body such as a vehicle with light source units 38 described later, the image recognition_ECU 13 recognizes the light emission pattern of light emitted from the light source units 38. An example of the light emission pattern includes light emission timing, the color of emitted light beams, the array of the emitted light beams, and the light emission order of emitting the light beams.

Thus, in the present embodiment, the image recognition_ECU 13 corresponds to a specific example as a traveling environment recognizer configured to recognize traveling environment information outside the vehicle, and a light emission pattern recognizer configured to recognize a light emission pattern of a specific part of a moving body, along with the stereo cameras 11 and the IPU 12.

The traveling_ECU 14 is a control unit configured to perform overall control of the drive assist apparatus 1.

Various control units such as a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are connected to the traveling_ECU 14 via an in-vehicle communication line such as a controller area network (CAN).

In addition, various sensors such as a locator unit 36, a left front side sensor 37lf, a right front side sensor 37rf, a left rear side sensor 37lf, and a right rear side sensor 37rr are connected to the traveling_ECU 14.

Furthermore, the light source units 38, which are configured to transmit information to other vehicles in the surroundings of the vehicle M by means of light emission patterns, are connected to the traveling_ECU 14.

A human machine interface (HMI) 31 located around the driver's seat is connected to the CP_ECU 21. The HMI 31 includes, for example, an operation switch configured to set and execute various types of drive assist control, a mode selection switch configured to switch the drive assist mode, a steering touch sensor configured to detect the driver's steering state, a turn signal switch, a driver monitoring system (DMS) configured to recognize the driver's face and to detect the driver's line of sight, a touchscreen display, a combination meter, and a loudspeaker.

On receipt of a control signal from the traveling_ECU 14, the CP_ECU 21 appropriately informs, by means of display and sound using the HMI 31, the driver of various warnings for the preceding vehicle, etc., the implementation status of drive assist control, and various types of information related to the traveling environment of the vehicle M.

Moreover, the CP_ECU 21 outputs various types of input information, such as the on or off operation state for various types of drive assist control input by the driver via the HMI 31, the vehicle velocity (set vehicle velocity) Vs set to the vehicle M, and the operation state of the turn signal switch, to the traveling_ECU 14.

Furthermore, the CP_ECU 21 estimates the driver's state of alertness based on, for example, a change in the driver's line of sight detected by the DMS. Then, the CP_ECU 21 outputs the estimated driver's state of alertness to the traveling_ECU 14.

A throttle actuator 32 for an electronically controlled throttle is connected to the output side of the E/G_ECU 22. Moreover, various sensors such as an accelerator sensor (not illustrated) are connected to the input side of E/G_ECU 22.

The E/G_ECU 22 applies drive control to the throttle actuator 32 based on a control signal from the traveling_ECU 14 or detection signals from various sensors. In doing so, the E/G_ECU 22 adjusts the amount of air intake of the engine and generates a desired engine output. In addition, the E/G_ECU 22 outputs signals such as an accelerator opening detected by various sensors to the traveling_ECU 14.

A hydraulic control circuit 33 is connected to the output side of the T/M_ECU 23. In addition, various sensors such as a shift position sensor (not illustrated) are connected to the input side of the T/M_ECU 23. The T/M_ECU 23 applies hydraulic control to the hydraulic control circuit 33 based on an engine torque signal estimated by the E/G_ECU 22 or detection signals from various sensors. In doing so, the T/M_ECU 23 operates friction engagement elements, pulleys, and the like provided in the automatic transmission, and shifts the engine output at a desired transmission ratio. Moreover, the T/M_ECU 23 outputs signals such as a shift position detected by various sensors to the traveling_ECU 14.

A brake actuator 34 is connected to the output side of the BK_ECU 24. The brake actuator 34 adjusts the brake fluid pressure output to a brake wheel cylinder provided in each wheel. In addition, various sensors such as a brake pedal sensor, a yaw rate sensor, a longitudinal acceleration sensor, and a vehicle velocity sensor (none of which are illustrated) are connected to the input side of the BK_ECU 24.

The BK_ECU 24 applies drive control to the brake actuator 34 based on a control signal from the traveling_ECU 14 or detection signals from various sensors. In doing so, the BK_ECU 24 appropriately generates, in each wheel, a braking force for performing forced braking control and yaw rate control of the vehicle M. The BK_ECU 24 also outputs signals such as the brake operation state, yaw rate, longitudinal acceleration, and vehicle velocity detected by various sensors to the traveling_ECU 14.

An electric power steering motor 35 is connected to the output side of the PS_ECU 25. The electric power steering motor 35 imparts steering torque due to the rotational force of the motor to the steering mechanism. Moreover, various sensors such as a steering torque sensor and a steering angle sensor are connected to the input side of the PS_ECU 25.

The PS_ECU 25 applies drive control to the electric power steering motor 35 based on a control signal from the traveling_ECU 14 or detection signals from various sensors. In doing so, the PS_ECU 25 generates steering torque for the steering mechanism. In addition, the PS_ECU 25 outputs signals such as steering torque and a steering angle detected by various sensors to the traveling_ECU 14.

The locator unit 36 includes a global navigation satellite system (GNSS) sensor 36*a* and a high-precision road map database (road map DB) 36*b*.

The GNSS sensor 36*a* measures the position (latitude, longitude, and altitude) of the vehicle M by receiving positioning signals transmitted from positioning satellites.

The road map DB 36*b* is a mass storage medium such as a hard disk drive (HDD). The road map DB 36*b* stores high-precision road map information (dynamic map). The road map information includes, for example, lane width data, lane center position coordinate data, lane travel azimuth angle data, and velocity limit data as lane data necessary for autonomous driving. The lane data is stored at intervals of several meters for each lane on the road map. For example, based on a request signal from the traveling_ECU 14, the road map DB 36*b* outputs, as traveling environment information, road map information in a set range with respect to the vehicle position measured by the GNSS sensor 36*a* to the traveling_ECU 14.

As described above, in the present embodiment, the road map DB 36*b* corresponds to a specific example as a traveling environment recognizer configured to recognize, along with the GNSS sensor 36*a*, traveling environment information outside the vehicle.

The left front side sensor 37*lf* and the right front side sensor 37*rf* are composed of, for example, millimeter wave radars. The left front side sensor 37*lf* and the right front side sensor 37*rf* are disposed in the left and right side portions of the front bumper, for example. The left front side sensor 37*lf* and the right front side sensor 37*rf* detect, as traveling environment information, three-dimensional objects present in areas Alf and Arf diagonally ahead of and to the side of the vehicle M (see FIG. 3), which are difficult to recognize in images of the stereo cameras 11.

The left rear side sensor 37*lf* and the right rear side sensor 37*rr* are composed of, for example, millimeter wave radars. The left rear side sensors 37*lr* and the right rear side sensors 37*rr* are disposed in the left and right side portions of the rear bumper, for example. The left rear side sensor 37*lf* and the right rear side sensor 37*rf* detect, as traveling environment information, three-dimensional objects present in areas Alr and Arr which are diagonally to the left and right side and rear of the vehicle M (see FIG. 3), which are difficult to recognize with the left front side sensor 37*lf* and the right front side sensor 37*rf*.

Here, when each radar is composed of a millimeter wave radar, the millimeter wave radar mainly detects three-dimensional objects such as vehicles traveling along or behind the vehicle M by analyzing waves reflected from an object with respect to the output radio waves. In one example, each radar detects, as information on a three-dimensional object, the width of the three-dimensional object, the position of the representative point of the three-dimensional object (relative position with respect to the vehicle M), the velocity of the three-dimensional object, and the like.

As described above, in the present embodiment, the left front side sensor 37*lf*, the right front side sensor 37*rf*, the left rear side sensor 37*lr*, and the right rear side sensor 37*rr* correspond to a specific example as a traveling environment recognizer configured to recognize traveling environment information outside the vehicle.

The coordinates of each target outside the vehicle M included in the traveling environment information recognized by each of the image recognition_ECU 13, the locator unit 36, the left front side sensor 37*lf*, the right front side sensor 37*rf*, the left rear side sensor 37*lf*, and the right rear side sensor 37*rr* are all converted by the traveling_ECU 14 to coordinates in the three-dimensional coordinate system (see FIG. 3) with the center of the vehicle M as the origin.

Figure 4:
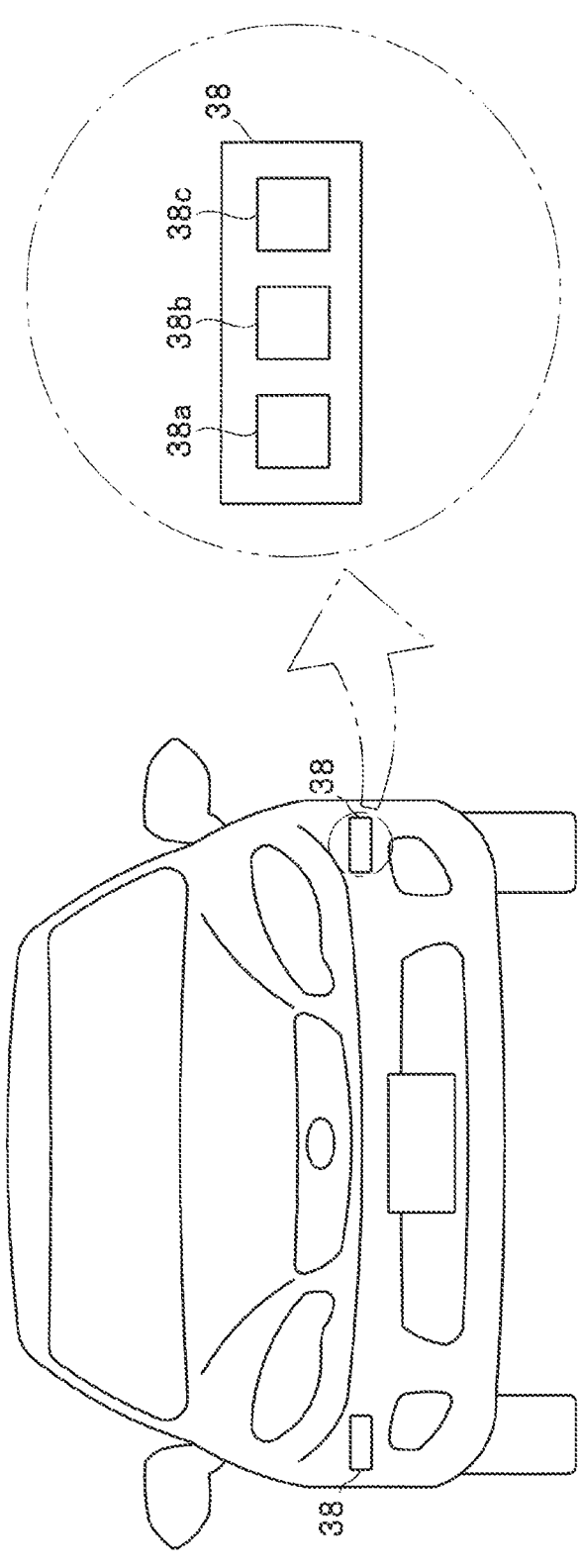
FIG. 4 is a schematic diagram of light source units mounted on a vehicle.

The light source units 38 are provided in specific parts of the vehicle M. As the specific parts, for example, at least one of the four corners of the vehicle M (the left and right side portions of the front bumper and the left and right side portions of the rear bumper), the rear of the vehicle M, or the roof of the vehicle M is set. FIG. 4 illustrates a configuration in which the light source units 38 are provided in the left and right side portions of the front bumper.

Each of the light source units 38 has, as light sources, for example, plural (for example, three) light emitting diodes (LEDs) 38*a*, 38*b*, and 38*c* that emit color beams in different colors. Each of these LEDs 38*a* to 38*c* can emit light according to a preset light emission pattern (light emission timing, the color of emitted light beams, the array of the emitted light beams, and the light emission order of emitting the light beams).

Here, in the present embodiment, multiple patterns are set as the light emission patterns of the light source units 38. Each light emission pattern is standardized in association with a risk degree R of the vehicle M, which is described later.

Note that each of the light source units 38 may be configured with, for example, a single light source. Alternatively, each of the light source units 38 may be configured to display characters, symbols, etc. using plural light sources disposed in a matrix, for example.

The following driving modes are set to the traveling_ECU 14: a manual driving mode, a first traveling control mode and a second traveling control mode, which are modes for traveling control, and an evacuation mode. Each of these driving modes can be selectively switched by the traveling_ECU 14 based on, for example, the operation status of the mode selection switch provided in the HMI 31.

Here, the manual driving mode is a driving mode that involves the driver to hold the steering wheel. That is, the manual driving mode is a driving mode in which the vehicle M is caused to travel according to the driver's driving operations such as a steering operation, an accelerator operation, and a brake operation.

Likewise, the first traveling control mode is also a driving mode that involves the driver to hold the steering wheel. That is, the first traveling control mode is a semi-autonomous driving mode in which the vehicle M is caused to travel while reflecting the driver's driving operations. The first traveling control mode is realized by, for example, outputting various control signals from the traveling_ECU 14 to the E/G_ECU 22, the BK_ECU 24, and the PS_ECU 25. In the first traveling control mode, adaptive cruise control (ACC), active lane keep centering (ALKC), active lane keep assist (ALKA), and lane change control are performed in an appropriate combination. In doing so, the vehicle M is able to travel along the target traveling route. Furthermore, in the first traveling control mode, lane change control can also be performed when the driver operates the turn signal switch.

Here, adaptive cruise control (ACC) is basically based on traveling environment information input from the image recognition_ECU 13 and the like.

In one example, the traveling_ECU 14 performs automatic safe-distance maintaining control as part of adaptive cruise control (ACC) when, for example, a preceding vehicle is recognized ahead of the vehicle M by the image recognition_ECU 13 or the like. In the automatic safe-distance maintaining control, the traveling_ECU 14 sets a target vehicle-to-vehicle distance Lt and a target vehicle velocity Vt based on the vehicle velocity Vl of the preceding vehicle. Then, the traveling_ECU 14 applies acceleration/deceleration control to the vehicle M based on the target vehicle-to-vehicle distance Lt and the target vehicle velocity Vt. In doing so, the traveling_ECU 14 basically causes the vehicle M to follow the preceding vehicle while maintaining a vehicle-to-vehicle distance L at the target vehicle-to-vehicle distance Lt and a vehicle velocity V at the target vehicle velocity Vt.

In contrast, in the case where no preceding vehicle is recognized ahead of the vehicle M by the image recognition_ECU 14 or the like, the traveling_ECU 14 performs constant velocity traveling control as part of adaptive cruise control (ACC). In the constant velocity traveling control, the traveling_ECU 14 sets a set vehicle velocity Vs input by the driver as a target vehicle velocity Vt. Then, the traveling_ECU 14 applies acceleration/deceleration control to the vehicle M based on the target vehicle velocity Vt. In doing so, the traveling_ECU 14 maintains the vehicle velocity V of the vehicle M at the set vehicle velocity Vs.

In addition, active lane keep centering (ALKC) and active lane keep assist (ALKA) are basically performed based on traveling environment information input from at least any one of the image recognition_ECU 13 or the locator unit 36. That is, the traveling_ECU 14 sets a target course Rm along the left and right lane section lines, in the center of the vehicle traveling lane based on, for example, lane section line information included in the traveling environment information. Based on the target course Rm, the traveling_ECU 14 performs feedforward control and feedback control of steering, thereby maintaining the vehicle M in the center of the lane. When the traveling_ECU 14 determines that it is highly likely that the vehicle M will deviate from the vehicle traveling lane due to crosswind, road cant, or the like, the traveling_ECU 14 suppresses lane deviation through forced steering control.

Moreover, lane change control is basically performed based on traveling environment information input from the image recognition_ECU 13, the left front side sensor 37*lf*, the right front side sensor 37*rf*, the left rear side sensor 37*lr*, and the right rear side sensor 37*rr*. The lane change control is executed when, for example, the driver operates the turn signal switch. That is, the traveling_ECU 14 recognizes the adjacent lane present in the operating direction of the turn signal switch based on the traveling environment information. In addition, the traveling_ECU 14 determines whether there are vehicles or the like in the adjacent lane that impede lane change. Then, when the traveling_ECU 14 determines that the adjacent lane has a space for the lane change, the traveling_ECU 14 changes the lane to the adjacent lane. The lane change control is performed in cooperation with adaptive cruise control (ACC).

The second traveling control mode is a driving mode in which the vehicle M is caused to travel without involving the driver's steering, accelerator operation, or brake operation. That is, the second traveling control mode is the so-called autonomous driving mode in which the vehicle M is caused to autonomously travel without involving the driver's driving operations. The second traveling control mode is realized when, for example, the traveling_ECU 14 outputs various control signals to the E/G_ECU 22, the BK_ECU 24, and the PS_ECU 25. In the second traveling control mode, mainly, preceding vehicle tracking control, active lane keep centering (ALKC), and active lane keep assist (ALKA) are performed in an appropriate combination. In doing so, the vehicle M is able to travel along the target route (route map information). Furthermore, in the second traveling control mode, lane change control can also be performed. Note that, in the second traveling control mode, lane change control is not only performed when the driver operates the turn signal switch, but also is performed automatically as appropriate according to the traveling route to the destination set to the vehicle M, traveling environment information, and the like.

The evacuation mode is a mode for automatically stopping the vehicle M on the roadside strip or the like. The evacuation mode is executed when, for example, while the vehicle M is traveling in the second traveling control mode, when it becomes impossible to continue traveling in the second traveling control mode and when the driving operation cannot be handed over to the driver (that is, when the driving mode cannot be changed to the manual driving mode or the first traveling control mode).

In the above-described driving modes, the traveling_ECU 14 applies emergency collision avoidance control as appropriate to an obstacle such as a vehicle that is highly likely to collide with the vehicle M. The emergency collision avoidance control includes, for example, autonomous emergency braking (AEB) and autonomous emergency steering (AES).

Figure 5:
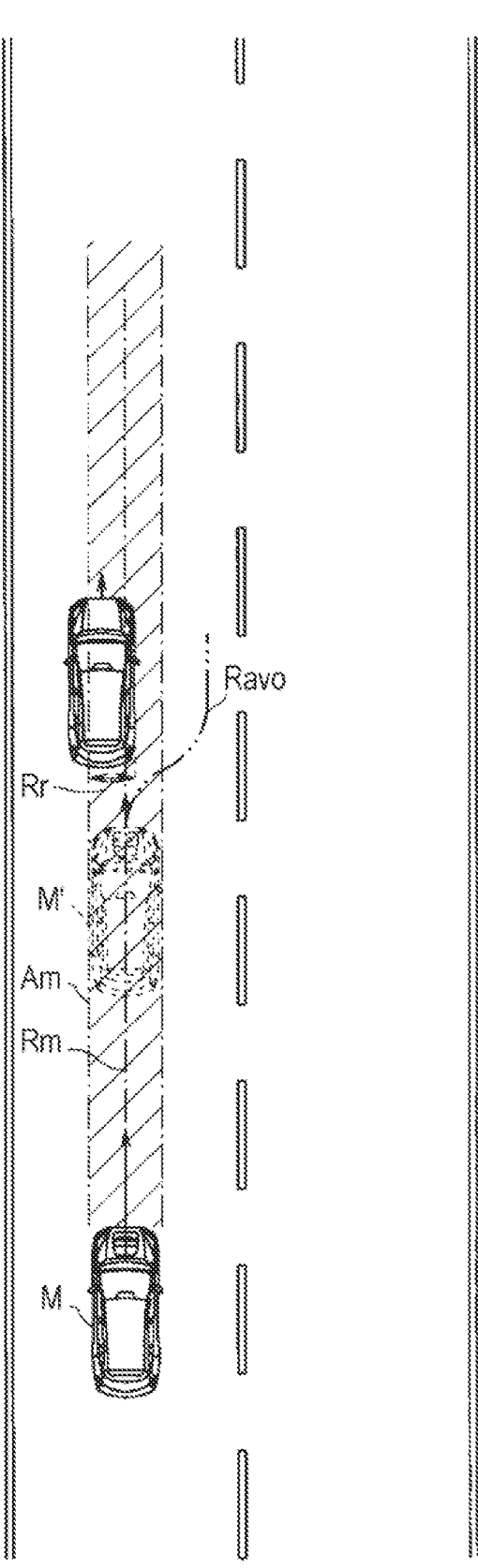
FIG. 5 is an explanatory diagram illustrating an obstacle present ahead in the vehicle's target course.

Basically, autonomous emergency braking (AEB) is control for avoiding a collision with an obstacle present ahead in the target course Rm of the vehicle M by braking. In autonomous emergency braking (AEB), the traveling_ECU 14 sets, for example, as illustrated in FIG. 5, a target progress area Am ahead of the vehicle M. The target progress area Am has a certain width (such as the vehicle width of the vehicle M or greater) centered on the target course Rm. Based on the traveling environment information, the traveling_ECU 14 detects obstacles such as preceding vehicles and stopped vehicles that are present in the target progress area Am. Furthermore, the traveling_ECU 14 calculates, as a predicted time of collision with an obstacle, a collision predicted time (vertical collision predicted time) TTCz in the longitudinal direction of the vehicle M. The vertical collision predicted time TTCz is calculated based on the relative velocity and the relative distance between vehicle M and the obstacle.

Then, when the vertical collision predicted time TTCz becomes less than a preset first threshold Tth1, the traveling_ECU 14 executes primary brake control. When the primary brake control is started, the traveling_ECU 14 decelerates the vehicle M using, for example, a preset first target deceleration a1 (such as 0.4 G).

Furthermore, when the vertical collision predicted time TTCz becomes less than a preset second threshold (note that Tth2<Tth1), the traveling_ECU 14 executes secondary brake control. When the secondary brake control is started, the traveling_ECU 14 decelerates the vehicle M using a preset second target deceleration a2 (such as 1 G) until the relative velocity with the obstacle becomes "0".

Autonomous emergency steering (AES) is control for avoiding a collision with an obstacle present ahead in the target course Rm of the vehicle M by steering. When the traveling_ECU 14 determines that a collision with the obstacle is unavoidable by secondary brake control, for example, the traveling_ECU 14 executes autonomous emergency steering (AES) instead of or in conjunction with autonomous emergency braking (AEB).

In one example, when the vertical collision predicted time TTCz becomes less than a preset third threshold (note that Tth3<Tth2), the traveling_ECU 14 executes autonomous emergency steering (AES) (for example, see a vehicle M' in FIG. 5).

In autonomous emergency steering (AES), the traveling_ECU 14 sets a target lateral position to the side of the obstacle. In addition, the traveling_ECU 14 sets a new target course Ravo for allowing the vehicle M to reach the target lateral position. The new target course Ravo is set to split into two sections: a cut-up section for allowing the vehicle M to evacuate to the side of the obstacle; and a cut-back section for allowing the vehicle M to recover its attitude in the direction along the vehicle traveling path. Then, the traveling_ECU 14 executes steering control along the new target course Ravo.

Note that the traveling_ECU 14 is also able to variably set the first to third thresholds Tth1 to Tth3 according to the wrap rate in the vehicle width direction of the obstacle with respect to the vehicle M. The wrap rate Rr is calculated, for example, based on the amount of entry of the obstacle into the target progress area Am. Then, the traveling_ECU 14 sets the first to third thresholds Tth1 to Tth3 so that the higher the wrap rate Rr, the larger the first to third thresholds Tth1 to Tth3 become, using, for example, a preset map or the like.

By the way, in the case where the vehicle M is traveling on the road with no median strip, the case in which an oncoming moving body O present in the oncoming lane suddenly enters the traveling lane of the vehicle M is assumed. Here, in the present embodiment, the oncoming moving body O refers to an oncoming vehicle (including a motorcycle) that moves with a velocity component in the direction opposite to the direction of movement of the vehicle M. To realize avoidance of a collision with the oncoming moving body O as mentioned above, the traveling_ECU 14 in the present embodiment extendedly applies emergency collision avoidance control to the oncoming moving body O entering the traveling lane of the vehicle M from the oncoming lane of the road with no median strip.

Prior to emergency collision avoidance control targeted to the oncoming moving body O, the traveling_ECU 14 appropriately performs preliminary collision avoidance control as needed. The preliminary collision avoidance control is control for suppressing in advance the risk of collision of the oncoming moving body O with the vehicle M.

In order to execute preliminary collision avoidance control, the traveling_ECU 14 obtains information on various moving objects such as other vehicles present in the surroundings of the vehicle M via the stereo cameras 11. That is, the traveling_ECU 14 obtains, as information on other vehicles, information such as the position of the other vehicles in the real space, the movement velocity of the other vehicles, and the movement direction of the other vehicles from traveling environment information, and, when the light source units 38 are provided in the other vehicles, obtains the risk degree R when the other vehicles travel, based on the light emission pattern of the light source units 38.

In addition, the traveling_ECU 14 calculates the risk degree R of the vehicle M as information for informing other vehicles present in the surroundings of the vehicle M. That is, the traveling_ECU 14 calculates the distance from the left and right section lines dividing the traveling lane in which the vehicle M travels to the vehicle M (for example, the distance from the left and right section lines to the left and right side ends of the vehicle M) as lateral positions with respect to the left and right section lines. The calculation of the lateral positions with respect to the section lines is performed based on, example, traveling environment information. In addition, the calculation of the lateral positions with respect to the section lines is performed at each preset calculation cycle. Then, the traveling_ECU 14 calculates the risk degree R based on the history of the lateral positions with respect to the section lines calculated at each preset cycle within a preset period of time.

Figure 7:
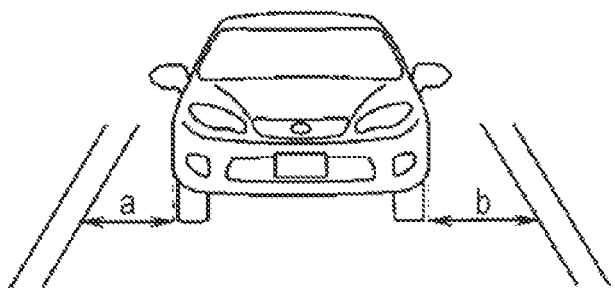
FIG. 7 is an explanatory diagram illustrating the vehicle's lateral positions relative to section lines.

In one example, the traveling_ECU 14 calculates the distances from the left and right section lines dividing the traveling lane of the vehicle M to the vehicle M as lateral positions a and b with respect to the left and right section lines (see FIG. 7). Then, the traveling_ECU 14 holds the calculated lateral positions a and b with respect to the left and right section lines as a history for a preset period of time 3T (seconds).

In addition, the traveling_ECU 14 calculates a risk degree intermediate value for the oncoming moving body O based on the history of the lateral positions a and b with respect to the left and right section lines in each preset section.

In the present embodiment, the risk degree intermediate value is calculated based on, for example, the history of the lateral positions a and b with respect to the left and right section lines every time the oncoming moving body O moves for T seconds.

In the calculation of the risk degree intermediate value, the traveling_ECU 14 calculates an average a_ave of the lateral position a relative to the left section line and an average b_ave of the lateral position b relative to the right section line in every past T seconds.

In addition, the traveling_ECU 14 calculates a difference $\Delta x$ (=a_ave−b_ave) between the averages of the lateral positions with respect to the left and right section lines in every past T seconds. In doing so, the traveling_ECU 14 determines the movement direction of the oncoming moving body O in the road width direction in every past T seconds. That is, for example, in the case where the difference $\Delta x$ between the averages is a negative value, the traveling_ECU 14 determines that the movement direction of the vehicle M is leftward. In contrast, for example, in the case where the difference $\Delta x$ between the averages is a positive value, the traveling_ECU 14 determines that the movement direction of the vehicle M is rightward.

Then, in the case where the absolute value of the difference between the averages $|\Delta x|$ (=|a_ave−b_ave|) is greater than a preset threshold $\Delta x$th, the traveling_ECU 14 determines that the vehicle M is moving in the direction determined as described above. In contrast, in the case where the absolute value of the difference between the averages $|\Delta x|$ (=|a_ave−b_ave|) is less than or equal to the preset threshold $\Delta x$th, the traveling_ECU 14 determines that the vehicle M is not moving in the road width direction.

Accordingly, the traveling_ECU 14 sequentially recognizes the movement direction while the vehicle M has moved from the past 3T seconds to the past 2T seconds (time point t–2), the movement direction while the vehicle M has moved from the past 2T seconds to the past T seconds (time point t–1), and the movement direction of the vehicle M from the past T seconds and the present (time point t).

Figure 8:
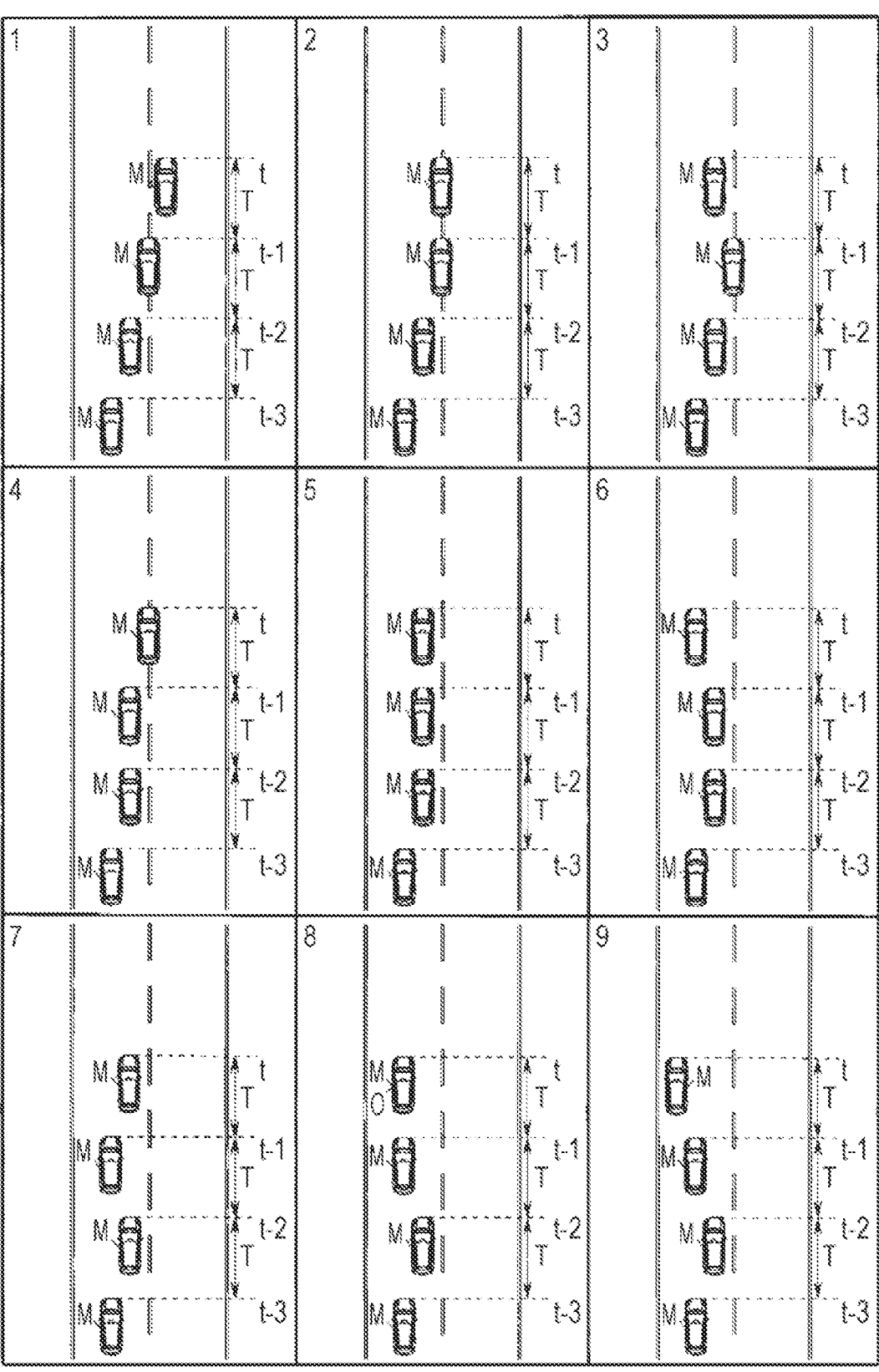
FIG. 8 is an explanatory diagram illustrating the vehicle's behavior patterns.
Figure 9:
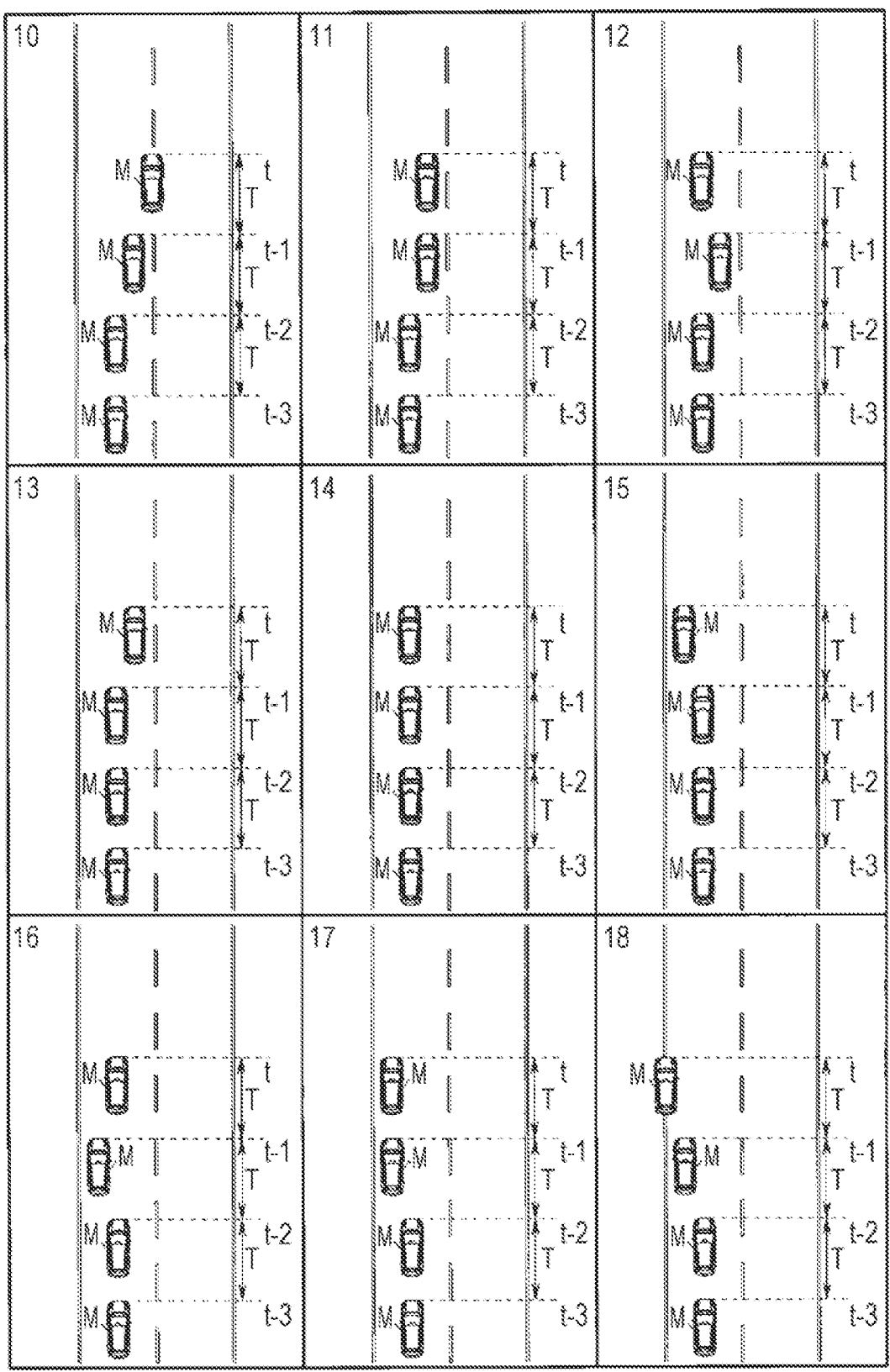
FIG. 9 is an explanatory diagram illustrating the vehicle's behavior patterns.
Figure 10:
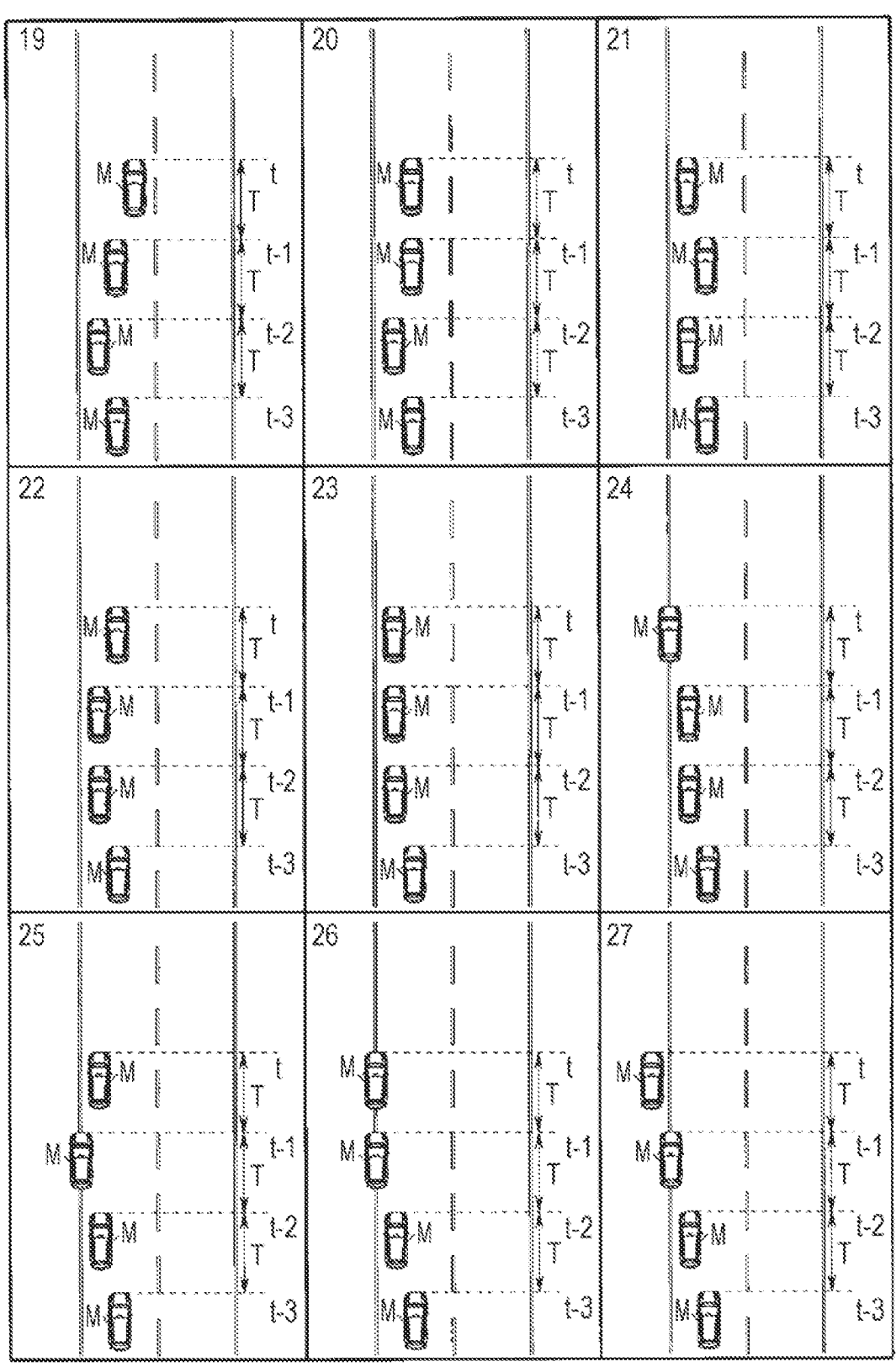
FIG. 10 is an explanatory diagram illustrating the vehicle's behavior patterns.

The combination of the behaviors of the vehicle M at the time point t–2, time point t–1, and time point t is classified into any of the 27 patterns illustrated in FIGS. 8 to 10, for example. The traveling_ECU 14 calculates risk degree intermediate values Rt–2, Rt–1, and Rt at the respective time points based on the classified behavior pattern of the vehicle M. The risk degree intermediate values Rt–2, Rt–1, and Rt can be calculated with reference to, for example, a map illustrated in FIG. 11. Then, the traveling_ECU 14 calculates the final risk degree R for the vehicle M by adding up the calculated risk degree intermediate values Rt–2, Rt–1, and Rt.

Furthermore, the traveling_ECU 14 can also correct the risk degree R, which is calculated based on the history of the lateral positions with respect to the section lines, based on the driver's various behaviors.

For example, in response to an input of information on the driver's state of alertness from the CP_ECU 21, the traveling_ECU 14 calculates a risk degree R1 according to the state of alertness based on the preset map or the like.

In addition, in response to an input of information on the driver's sudden accelerator operation from the E/G_ECU 22, the traveling_ECU 14 calculates a risk degree R2 according to the accelerator operation based on the preset map or the like.

Moreover, in response to an input of information on the driver's sudden brake operation from the BK_ECU 24, the traveling_ECU 14 calculates a risk degree R3 according to the brake operation based on the preset map or the like.

Also, in response to an input of information on the driver's sudden steering from the PS_ECU 25, the traveling_ECU 14 calculates a risk degree R4 according to the steering based on the preset map or the like.

Furthermore, in response to detection of the driver's abnormal operation that the driver has ignored the traffic rules (such as ignoring the traffic light) based on traveling environment information and road map information from the locater unit 36, the traveling_ECU 14 calculates a risk degree R5 according to the abnormal operation based on the preset map or the like.

When these risk degrees R1 to R5 are calculated, the traveling_ECU 14 appropriately corrects the risk degree R, calculated based on the history of the lateral positions with respect to the section lines, using the risk degrees R1 to R5.

Needless to say, note that the driver's behaviors, which are used for calculating the risk degree, are not limited to the above-mentioned behaviors. Instead of the risk degree R based on the history of the lateral positions with respect to the section lines, the traveling_ECU 14 can also calculate the risk degree R as appropriate using one or more of the risk degrees R1 to R5 based on the driver's various behaviors. That is, the traveling_ECU 14 calculates the risk degree R of a risk of the vehicle M on the surrounding vehicles based on at least one of the history of the behavior of the vehicle M with respect to the section lines or the behavior of the driver who is driving the vehicle M.

Then, the traveling_ECU 14 informs a moving body such as another vehicle present in the surroundings of the vehicle M of the risk degree R of the vehicle M calculated as above via the light source units 38.

As described above, in the present embodiment, the traveling_ECU 14 is able to obtain information such as the risk degree R of other vehicles, as well as to inform other vehicles of information such as the risk degree R of the vehicle M.

Figure 6:
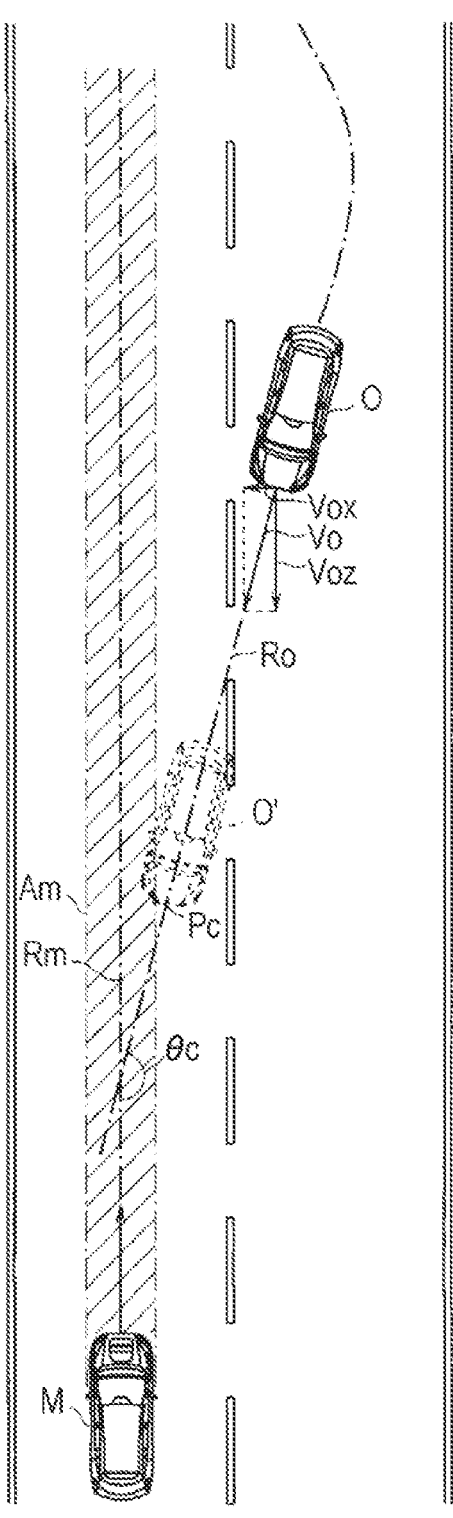
FIG. 6 is an explanatory diagram illustrating an oncoming moving body present on an oncoming lane.

In order to execute preliminary collision avoidance control, the traveling_ECU 14 determines, based on traveling environment information, whether the road has a median strip that divides the traveling lane of the vehicle M and the oncoming lane. In the case where there is no median strip on the road where the vehicle M travels, the traveling_ECU 14 detects, for example, the oncoming moving body O moving in the oncoming lane (see FIG. 6). This detection of the oncoming moving body O is basically performed based on traveling environment information recognized by the image recognition_ECU 13.

In response to detection of the oncoming moving body O, the traveling_ECU 14 calculates a vertical velocity component Voz and a lateral velocity component Vox corresponding to the longitudinal direction and the vehicle width direction of the vehicle M based on the movement velocity of the oncoming moving body O (hereinafter referred to as velocity Vo).

Moreover, the traveling_ECU 14 calculates, as the predicted time of collision with the oncoming moving body O, the collision predicted time (vertical collision predicted time) TTCz in the longitudinal direction of the vehicle M and a collision predicted time (lateral collision predicted time) TTCx in the vehicle width direction of the vehicle M.

That is, the traveling_ECU 14 calculates the vertical collision predicted time TTCz by, for example, dividing the relative velocity in the vertical direction, which is calculated from the vehicle velocity V of the vehicle M and the vertical velocity component Voz of the oncoming moving body O, by the relative distance in the vertical direction between the vehicle M and the oncoming moving body O.

In addition, the traveling_ECU 14 calculates the lateral collision predicted time TTCx by, for example, dividing the lateral velocity component Vox of the oncoming moving body O by the distance from the oncoming moving body O to the target progress area Am. In the calculation of the lateral collision predicted time TTCx, it is desirable that the distance from the oncoming moving body O to the target progress area Am be corrected based on the width of the oncoming moving body O and the angle at which the moving body O enters the target progress area Am (predicted collision angle).

Furthermore, in the case where the oncoming moving body O is equipped with the light source units 38, the traveling_ECU 14 obtains the risk degree R of the oncoming moving body O based on the light emission pattern of the light source units 38 recognized by the image recognition_ECU 13. That is, the traveling_ECU 14 refers to a map or the like set in advance in the traveling_ECU 14 to obtain the risk degree R of the oncoming moving body O according to the light emission pattern of the light source units 38. Furthermore, the traveling_ECU 14 determines, based on the obtained risk degree R, whether the oncoming moving body O is an obstacle likely to collide with the vehicle M. In response to recognition that the oncoming moving body O is an obstacle, the traveling_ECU 14 executes preliminary collision avoidance control as appropriate, which is prior to emergency collision avoidance control, for the oncoming moving body O.

Here, in the present embodiment, the configuration of the drive assist apparatus 1 mounted on the oncoming moving body O is the same as or similar to the configuration of the drive assist apparatus 1 mounted on the vehicle M. Therefore, a description of the detailed configuration of the drive assist apparatus 1 mounted on the oncoming moving body O is omitted. In the following description, when it is necessary to distinguish between the drive assist apparatus 1 related to the vehicle M and each component of the drive assist apparatus 1 and the drive assist apparatus 1 related to the oncoming moving body O and each component of the drive assist apparatus 1, "m" or "o" is appropriately added to the end of each symbol.

As described above, in the present embodiment, the traveling_ECU 14 corresponds to a specific example as an emergency collision avoidance controller, a risk degree calculator, a risk degree obtainer, and a preliminary collision avoidance controller. To be more specific, when preliminary collision avoidance control performed by the vehicle M is considered as a reference, a traveling_ECU 14*m* corresponds to a specific example as an emergency collision avoidance controller, a risk degree obtainer, and a preliminary collision avoidance controller. In contrast, a traveling_ECU 140 corresponds to a specific example as a risk degree calculator.

Figure 12:
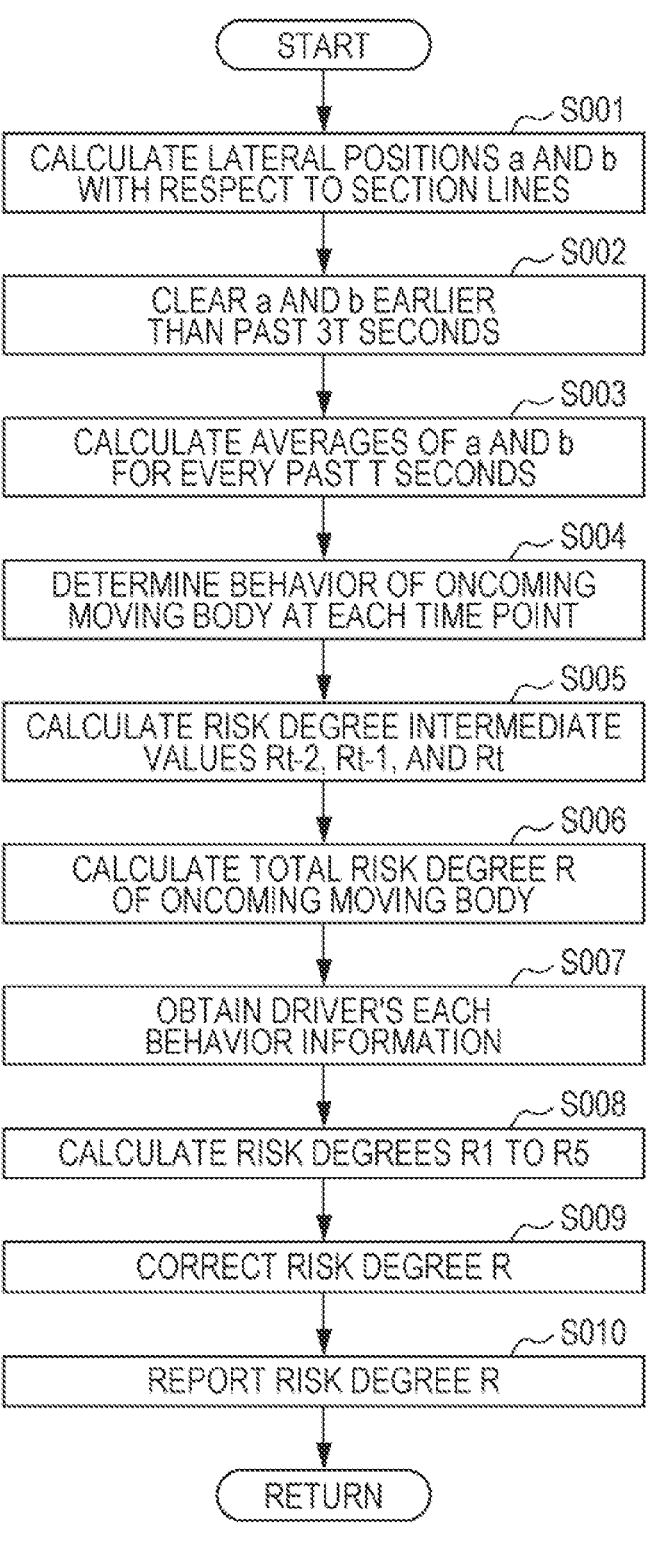
FIG. 12 is a flowchart illustrating a risk degree calculation routine.

Next, prior to the detailed description of preliminary collision avoidance control, calculation of the risk degree R performed in other vehicles will be described in accordance with the flowchart of a risk degree calculation routine illustrated in FIG. 12. Note that the calculation of the risk degree R is performed in various moving bodies with the drive assist apparatus 1 equipped with the light source units 38. Here, calculation of the risk degree R by the traveling_ECU 140 of the oncoming moving body O will be described.

When the routine starts, in step S001, the traveling_ECU 140 calculates the distances from the left and right section lines dividing the oncoming lane to the side ends of the oncoming moving body O as lateral positions a and b with respect to the section lines. Then, the traveling_ECU 140 stores the calculated lateral positions a and b with respect to the section lines as the movement history of the oncoming moving body O.

In the subsequent step S002, the traveling_ECU 140 clears the lateral positions a and b with respect to the section lines earlier than a preset time (past 3T seconds) among the stored lateral positions a and b with respect to the section lines.

In the subsequent step S003, the traveling_ECU 140 reads the movement history of the oncoming moving body O for the past 3T seconds, and calculates the average values a_ave and b_ave of the lateral positions a and b with respect to the left and right section lines for every past T seconds.

In the subsequent step S004, the traveling_ECU 140 determines the behavior of the oncoming moving body O at the time points t–2, t–1, and t based on the average values a_ave and b_ave of the lateral positions a and b with respect to the left and right section lines for every past T seconds. That is, the traveling_ECU 140 calculates the difference Δx between the average values a_ave and b_ave for each section of the past T seconds, and, based on the positive/negative sign and the absolute value of the difference Δx, recognizes the behavior of the oncoming moving body O at the time points t–2, t–1, and t.

In the subsequent step S005, the traveling_ECU 140 refers to the preset map or the like to sequentially calculates the risk degree intermediate values Rt–2, Rt–1, and Rt for the oncoming moving body O at the time points t–2, t–1, and t.

Then, in step S006, the traveling_ECU 140 calculates a value obtained by adding the calculated risk degree intermediate values Rt–2, Rt–1, and Rt as the risk degree R for the current oncoming moving body O.

In the subsequent step S007, the traveling_ECU 140 obtains the driver's various behavior information. That is, the traveling_ECU 140 obtains, for example, information on the driver's state of alertness, accelerator operation, brake operation, steering, and abnormal operation.

In the subsequent step S008, the traveling_ECU 140 calculates the risk degrees R1 to R5 based on the obtained driver's various behavior information.

In the subsequent step S009, the traveling_ECU 140 corrects the risk degree R using the calculated risk degrees R1 to R5. For example, the traveling_ECU 140 adds the calculated risk degrees R1 to R5 as appropriate to the risk degree R.

In the subsequent step S010, the traveling_ECU 140 informs the surroundings of the calculated and corrected risk degree R via the light source units 38.

Next, the details of preliminary collision avoidance control applied to the vehicle M will be described in accordance with the flowchart of a preliminary collision avoidance control routine illustrated in FIG. 13. The preliminary collision avoidance control routine is repeatedly executed for every set time by the traveling_ECU 14*m* when the vehicle M is traveling on a road without a median strip.

When the routine starts, in step S101, the traveling_ECU 14*m* checks whether there is an oncoming moving body O with the light source units 38 on the oncoming lane.

In the case where it is determined in step S101 that there is no oncoming moving body O with the light source units 38 on the oncoming lane (NO in step S101), the traveling_ECU 14*m* exits the routine as it is.

In contrast, in the case where it is determined in step S101 that the oncoming moving body O with the light source units 38 is present on the oncoming lane (YES in step S101), the traveling_ECU 14*m* proceeds to step S102.

In step S102, the risk degree R of the oncoming moving body O is obtained based on the light emission pattern of the light source units 38 of the oncoming moving body O.

In the subsequent step S103, the traveling_ECU 14*m* calculates the vertical collision predicted time TTCz and the lateral collision predicted time TTCx of collision with the oncoming moving body O.

Proceeding from step S103 to step S104, the traveling_ECU 14*m* applies upper limit processing to the risk degree R. The upper limit processing is processing for preventing the risk degree R from becoming unnecessarily high due to factors other than wobbling of the oncoming moving body O.

In the upper limit processing, if the risk degree R is assumed to become high due to factors other than the wobbling of the oncoming moving body O, the traveling_ECU 14*m* limits the risk degree R to less than or equal to "4", for example.

Figure 14:
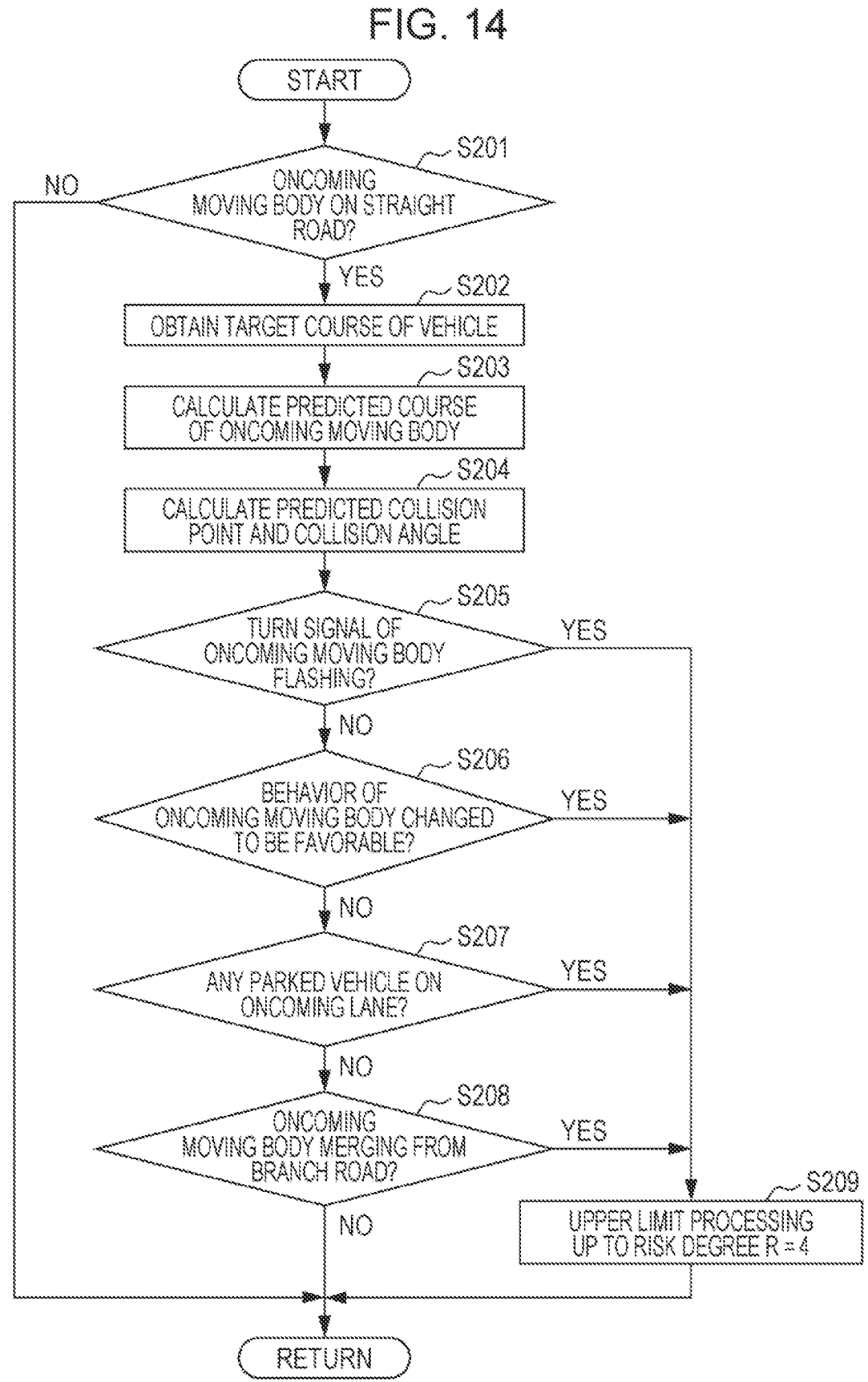
FIG. 14 is a flowchart illustrating a risk degree upper limit processing subroutine.

The upper limit processing applied to the risk degree R is executed in accordance with, for example, the flowchart of a risk degree upper limit processing subroutine illustrated in FIG. 14.

When the subroutine starts, in step S201, the traveling_ECU 14*m* checks whether the oncoming moving body O is moving on a straight road with good visibility.

In the case where it is determined in step S201 that the oncoming moving body O is not moving on a straight road (NO in step S201), the traveling_ECU 14*m* exits the subroutine as it is.

In contrast, in the case where it is determined in step S201 that the oncoming moving body O is moving on a straight road (YES in step S201), the traveling_ECU 14*m* proceeds to step S202.

In step S202, the traveling_ECU 14*m* obtains the target course Rm set to the vehicle M.

In the subsequent step S203, the traveling_ECU 14*m* calculates the predicted course Ro of the oncoming moving body O based on the current velocity and moving direction of the oncoming moving body O.

In the subsequent step S204, the traveling_ECU 14*m* calculates the predicted collision point Pc and collision angle θc between the vehicle M and the oncoming moving body O. For example, if it is assumed that the oncoming moving body O has moved on the predicted course Ro (see O' in FIG. 6), for example, the traveling_ECU 14*m* calculates the point at which both the vertical collision predicted time TTCz and the lateral collision predicted time TTCx are less than or equal to "0" as the predicted collision point Pc between the vehicle M and the oncoming moving body O (see FIG. 6). In addition, if it is assumed that the oncoming moving body O has moved to the predicted collision point Pc, the traveling_ECU 14*m* calculates the collision angle θc based on the relative angle between the oncoming moving body O' after the movement and the vehicle M.

In the subsequent step S205, the traveling_ECU 14*m* checks whether a turn signal of the oncoming moving body O is flashing.

In the case where it is determined in step S205 that a turn signal of the oncoming moving body O is flashing (YES in step S205), the traveling_ECU 14*m* proceeds to step S209.

In step S209, the traveling_ECU 14*m* applies upper limit processing to make the risk degree R less than or equal to "4", for example, and then exits the subroutine.

Figure 17:
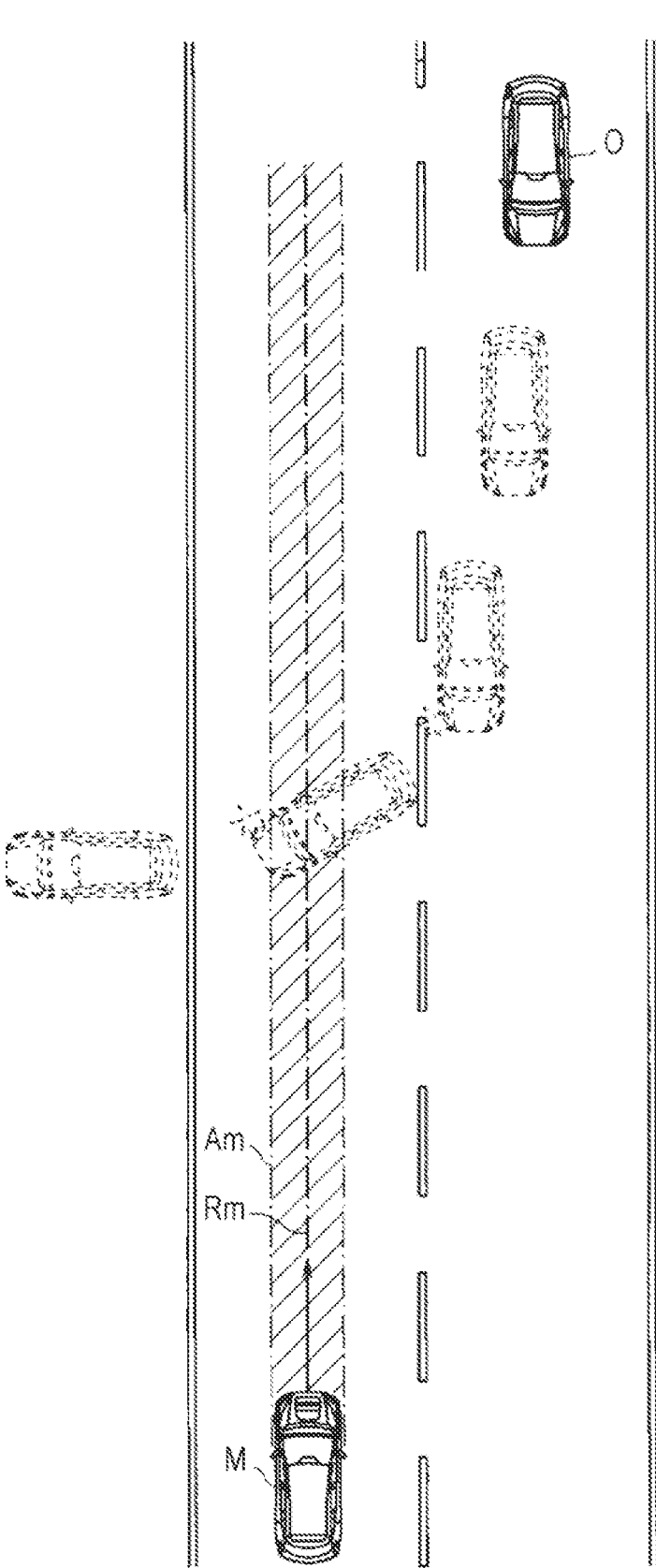
FIG. 17 is an explanatory diagram illustrating the case where the risk degree of the oncoming moving body increases due to a factor other than wobbling.

That is, for example, as illustrated in FIG. 17, as the case in which the risk degree R of the oncoming moving body O becomes high due to factors other than wobbling, the case is assumed in which the oncoming moving body O turns toward the traveling lane of the vehicle M while flashing its turn signal. In such a case, it is assumed that the intention of the driver who is driving the oncoming moving body O is clear, and that the driver is fully aware of the vehicle M. Therefore, in such a case, it is difficult to assume that the oncoming moving body O will suddenly enter the traveling lane of the vehicle M at a time point at which a collision with the vehicle M is highly likely; thus, the upper limit processing is performed to limit the control contents.

In contrast, in the case where it is determined in step S205 that no turn signal of the oncoming moving body O is flashing (NO in step S205), the traveling_ECU 14*m* proceeds to step S206.

In step S206, the traveling_ECU 14*m* checks whether the behavior of the oncoming moving body O has changed to be favorable for avoiding a collision with the vehicle M. That is, the traveling_ECU 14*m* checks whether the predicted course Ro of the oncoming moving body O, calculated in step S203, and the predicted collision point Pc and collision angle θc of collision with the oncoming moving body O, calculated in step S204, have changed to be favorable. Here, for example, when the lateral velocity component Vox of the oncoming moving body O turns to decrease, the predicted course Ro of the oncoming moving body O generally inclines toward the vehicle M side. In addition, for example, when the lateral velocity component Vox of the oncoming moving body O turns to decrease, the predicted collision point Pc of the oncoming moving body O generally moves to the vehicle M side. Moreover, for example, when the lateral velocity component Vox of the oncoming moving body O turns to decrease, the collision angle θc changes to increase. Then, when at least one of the case in which the predicted course Ro inclines toward the vehicle M side, the case in which the predicted collision point Pc moves to the vehicle M side, or the case in which the collision angle θc changes to increase is true, the traveling_ECU 14*m* determines that the behavior of the oncoming moving body O has changed to be unfavorable.

Then, in the case where it is determined that the behavior of the oncoming moving body O has changed to be favorable (YES in step S206), the traveling_ECU 14*m* proceeds to step S209.

In step S209, the traveling_ECU 14*m* applies upper limit processing to make the risk degree R less than or equal to "4", for example, and then exits the subroutine.

In contrast, in the case where it is determined in step S206 that the behavior of the oncoming moving body O has changed to be unfavorable (NO in step S206), the traveling_ECU 14*m* proceeds to step S207.

In step S207, the traveling_ECU 14*m* checks whether there is a still object such as a parked vehicle in the vicinity of the oncoming moving body O on the oncoming lane.

In the case where it is determined in step S207 that there is a parked vehicle or the like on the oncoming lane (YES in step S207), the traveling_ECU 14*m* proceeds to step S209.

In step S209, the traveling_ECU 14*m* applies upper limit processing to make the risk degree R less than or equal to "4", for example, and then exits the subroutine.

Figure 18:
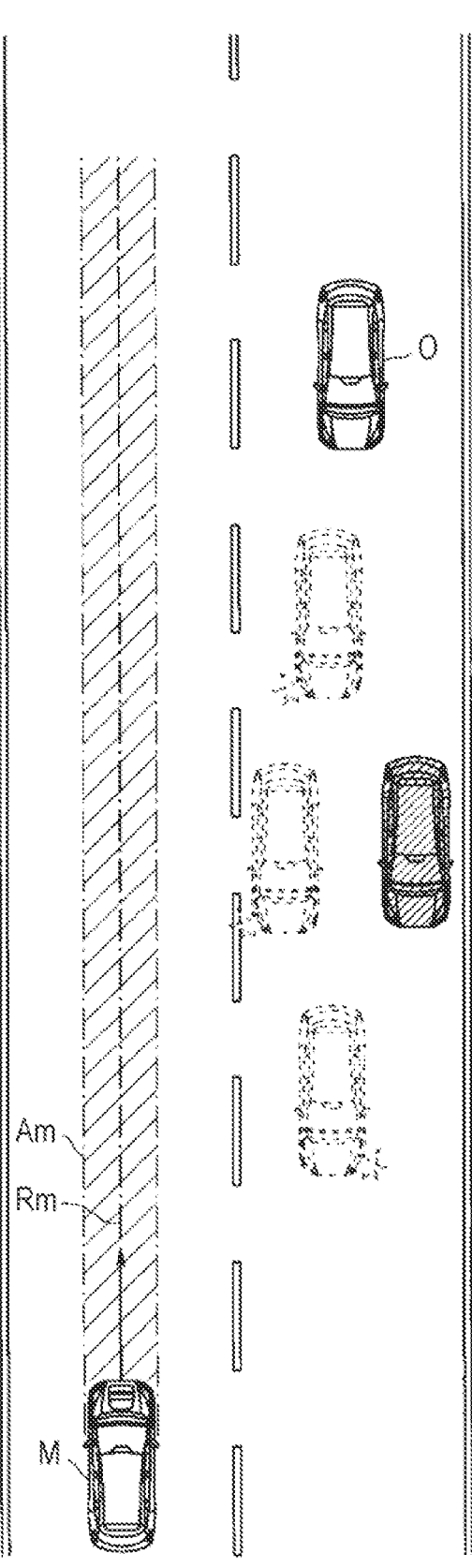
FIG. 18 is an explanatory diagram illustrating the case where the risk degree of the oncoming moving body increases due to a factor other than wobbling.

That is, for example, as illustrated in FIG. 18, as the case in which the risk degree R of the oncoming moving body O becomes high due to factors other than wobbling, the case is assumed in which the oncoming moving body O avoids a still object such as a parked vehicle present on the oncoming lane. In such a case, it is assumed that the intention of the driver who is driving the oncoming moving body O is clear, and that the driver is fully aware of the vehicle M. In addition, in such a case, it is assumed that the risk degree R calculated based on the risk determination area will increase once, and then quickly turns to decrease. Therefore, in such a case, it is difficult to assume that the oncoming moving body O will suddenly enter the traveling lane of the vehicle M at a time point at which a collision with the vehicle M is highly likely; thus, the upper limit processing is performed to limit the control contents.

In contrast, in the case where it is determined in step S207 that there is no parked vehicle or the like on the oncoming lane (NO in step S207), the traveling_ECU 14*m* proceeds to step S208.

In step S208, the traveling_ECU 14*m* checks whether the oncoming moving body O is currently merging the oncoming lane from a branch road.

In the case where it is determined in step S208 that the oncoming moving body O is currently merging the oncoming lane from a branch road (YES in step S208), the traveling_ECU 14*m* proceeds to step S209.

In step S209, the traveling_ECU 14*m* applies upper limit processing to make the risk degree R less than or equal to "4", for example, and then exits the subroutine.

Figure 19:
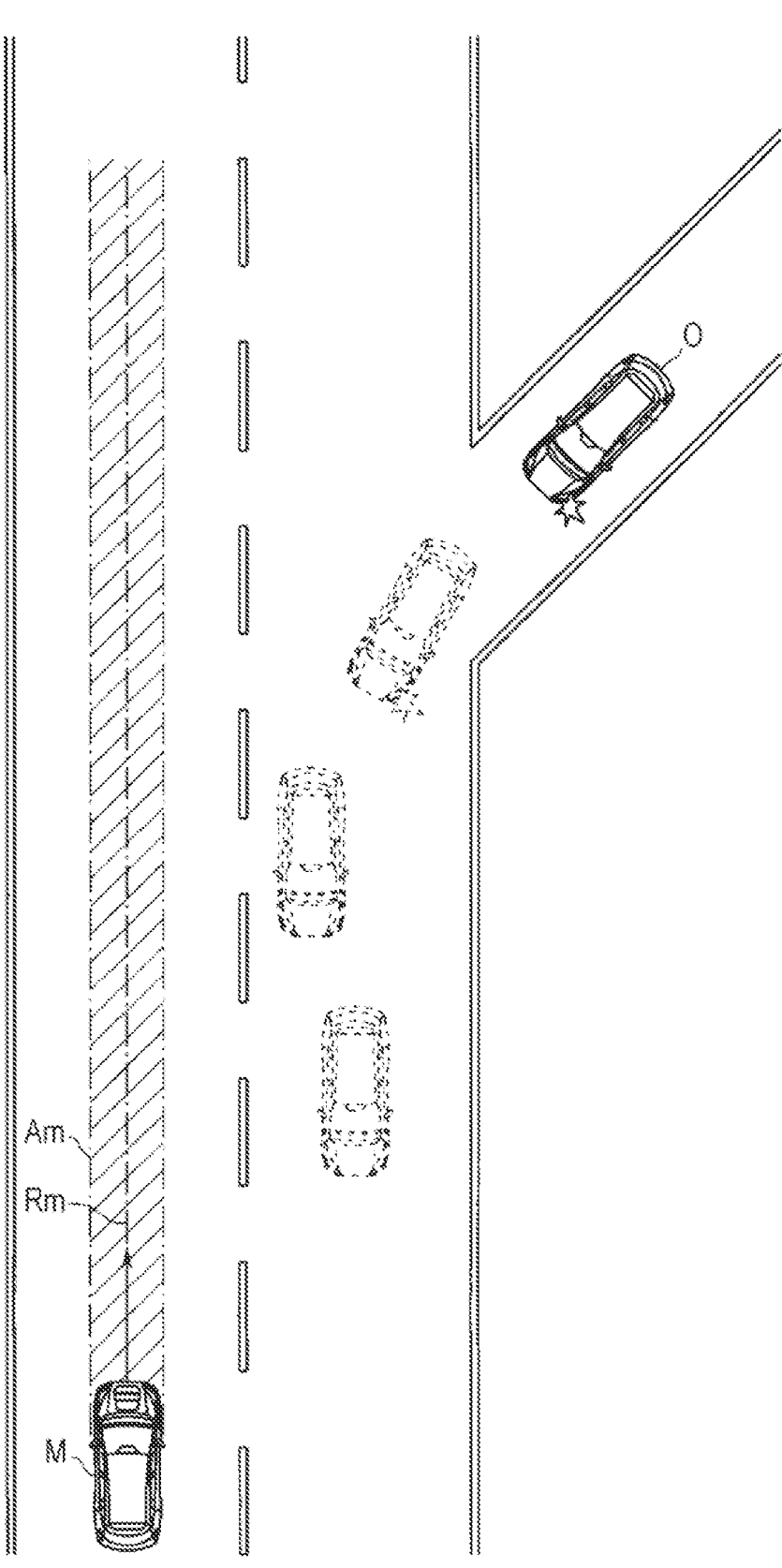
FIG. 19 is an explanatory diagram illustrating the case where the risk degree of the oncoming moving body increases due to a factor other than wobbling.

That is, for example, as illustrated in FIG. 19, as the case in which the risk degree R of the oncoming moving body O becomes high due to factors other than wobbling, the case is assumed in which the oncoming moving body O enters the oncoming lane from a branch road or the like. In such a case, it is assumed that the intention of the driver who is driving the oncoming moving body O is clear, and that the driver is fully aware of the vehicle M. In addition, in such a case, it is assumed that the risk degree R calculated based on the risk determination area will increase once, and then quickly turns to decrease. Therefore, in such a case, since it is difficult to assume that the oncoming moving body O suddenly enters the traveling lane of the vehicle M at a time point of a collision with the vehicle M, the upper limit processing is performed to limit the control contents.

In contrast, in the case where it is determined in step S208 that the oncoming moving body O is not currently merging the oncoming lane from a branch road (NO in step S208), the traveling_ECU 14*m* exits the subroutine as it is.

In the main routine illustrated in FIG. 13, proceeding from step S104 to step S105, the traveling_ECU 14*m* applies down processing to the risk degree R. The down processing is processing for appropriately lowering a risk level LV of preliminary collision avoidance control (described later) allowed according to the risk degree R based on the relative relationship between the vehicle M and the oncoming moving body O. For example, even in the case where the wobbling of the oncoming moving body O is large and the risk degree R of the oncoming moving body O entering the traveling lane of the vehicle M is high, if the oncoming moving body O is present at a distance, the probability that the vehicle M collides with the oncoming moving body O is low. In such a case, the traveling_ECU 14*m* lowers the risk level LV of preliminary collision avoidance control allowed according to the risk degree R in order to prevent excessive preliminary collision avoidance control from being executed.

Figure 15:
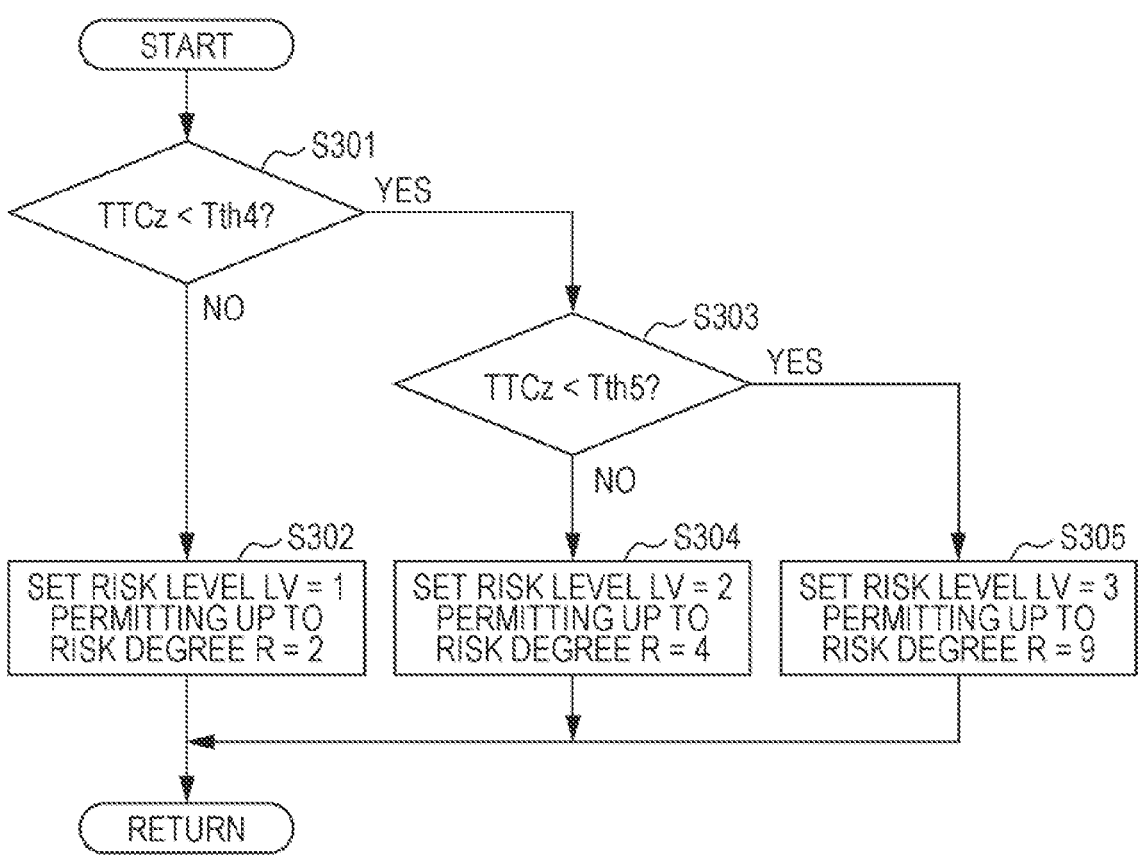
FIG. 15 is a flowchart illustrating a risk degree down processing subroutine.

The down processing is executed in accordance with, for example, the flowchart of a down processing subroutine illustrated in FIG. 15.

When the subroutine starts, in step S301, the traveling_ECU 14*m* checks whether the vertical collision predicted time TTCz of collision with the oncoming moving body O is less than a preset fourth threshold Tth4 (note that Tth1<Tth4).

In the case where it is determined in step S301 that the vertical collision predicted time TTCz is greater than or equal to the fourth threshold Tth4 (NO in step S301), the traveling_ECU 14*m* proceeds to step S302.

In step S302, the traveling_ECU 14*m* permits preliminary collision avoidance control corresponding to the case where the risk degree R is less than or equal to "2", and then exits the subroutine. In doing so, the traveling_ECU 14*m* permits preliminary collision avoidance control corresponding to the case where the risk degree R is "2" even if the current risk degree R is "9", for example. In addition, in the case where the current risk degree R is "2", for example, the traveling_ECU 14*m* permits preliminary collision avoidance control corresponding to the case where the risk degree R is "2". Note that, in the present embodiment, preliminary collision avoidance control corresponding to the case where the risk degree R is less than or equal to "2" is collision avoidance control when the risk level LV=1, which is associated with an "attention area" in the risk determination area.

In contrast, in the case where it is determined in step S301 that the vertical collision predicted time TTCz is less than the fourth threshold Tth4 (YES in step S301), the traveling_ECU 14*m* proceeds to step S303.

In step S303, the traveling_ECU 14*m* checks whether the vertical collision predicted time TICz is less than a preset fifth threshold Tth5 (note that Tth1≤Tth5<Tth4).

In the case where it is determined in step S303 that the vertical collision predicted time TTCz is greater than or equal to the fifth threshold Tth5 (NO in step S303), the traveling_ECU 14*m* proceeds to step S304.

In step S304, the traveling_ECU 14*m* permits preliminary collision avoidance control corresponding to the case where the risk degree R is less than or equal to "4", and then exits the subroutine. In doing so, the traveling_ECU 14*m* permits preliminary collision avoidance control corresponding to the case where the risk degree R is "4" even if the current risk degree R is "9", for example. In addition, in the case where the current risk degree R is "4", for example, the traveling_ECU 14*m* permits preliminary collision avoidance control corresponding to the case where the risk degree R is "4". Note that, in the present embodiment, preliminary collision avoidance control corresponding to the case where the risk degree R is greater than or equal to "2" and the risk degree R is less than or equal to "4" is collision avoidance control when the risk level LV=2, which is associated with an "alert area" in the risk determination area.

In contrast, in the case where it is determined in step S303 that the vertical collision predicted time TTCz is less than the fifth threshold Tth5 (YES in step S303), the traveling_ECU 14*m* proceeds to step S305.

In step S305, the traveling_ECU 14*m* permits preliminary collision avoidance control corresponding to the case where the risk degree R is less than or equal to "9", and then exits the subroutine. In doing so, the traveling_ECU 14*m* permits preliminary collision avoidance control corresponding to all the risk degrees R, for example. That is, in the case where the current risk degree R is "9", for example, the traveling_ECU 14*m* permits preliminary collision avoidance control corresponding to the case where the risk degree R is "9". In addition, in the case where the current risk degree R is "4", for example, the traveling_ECU 14*m* permits preliminary collision avoidance control corresponding to the case where the risk degree R is "4". Note that, in the present embodiment, preliminary collision avoidance control corresponding to the case where the risk degree R is greater than "4" and the risk degree R is less than or equal to "9" is collision avoidance control when the risk level LV=3, which is associated with a "dangerous area" in the risk determination area.

In the main routine illustrated in FIG. 13, proceeding from step S105 to step S106, the traveling_ECU 14*m* performs forced control intervention determination of the oncoming moving body O. The forced control intervention is determination for forcedly executing the preliminary collision avoidance control when the risk level LV=3 in an emergency such as when the oncoming moving body O continuously moves directly toward the vehicle M.

Figure 16:
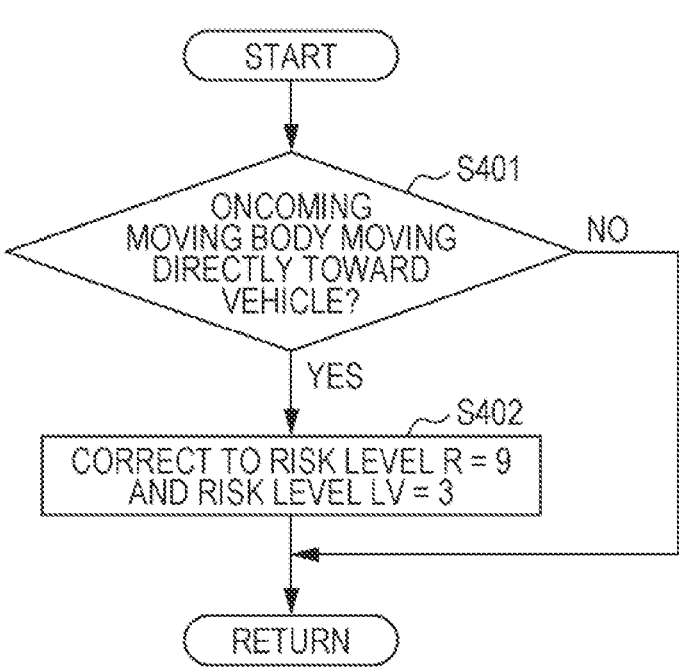
FIG. 16 is a flowchart illustrating a forced control intervention determination subroutine.

The forced control intervention determination is executed in accordance with, for example, a forced control intervention determination subroutine illustrated in FIG. 16.

When the subroutine starts, in step S401, the traveling_ECU 14*m* checks whether a state in which the oncoming moving body O moves directly toward the vehicle M continues for a set time (such as certain frames).

In the case where it is determined in step S401 that the oncoming moving body O is not directly moving toward the vehicle M (NO in step S401), the traveling_ECU 14*m* exits the subroutine as it is.

In contrast, in the case where it is determined in step S401 that the oncoming moving body O is directly moving toward the vehicle M (YES in step S401), the traveling_ECU 14*m* proceeds to step S402.

In step S402, the traveling_ECU 14*m* corrects the risk degree R for the oncoming moving body O to "9", for example, corrects the risk level LV allowed for the oncoming moving body O to "3", and then exits the subroutine.

In the main routine illustrated in FIG. 13, proceeding from step S106 to step S107, the traveling_ECU 14*m* determines what kind of preliminary collision avoidance action is to be taken for the oncoming moving body O. The preliminary collision avoidance action is determined based on the risk level LV currently allowed for the oncoming moving body O and the current risk degree R currently set to the oncoming moving body O, for example.

Here, for example, as illustrated in FIG. 20, in the case where the risk degree R for the current oncoming moving body O is "0", "O" is set as a risk level for the oncoming moving body O. If the risk level LV=0, the traveling_ECU 14*m* prohibits an output of warnings for informing the driver of the presence of the oncoming moving body O. In addition, if the risk level LV=0, the traveling_ECU 14*m* prohibits avoidance control in the vertical direction (longitudinal direction of the vehicle M) for the oncoming moving body O. Furthermore, if the risk level LV=0, the traveling_ECU 14*m* prohibits avoidance control in the lateral direction (vehicle width direction of the vehicle M) for the oncoming moving body O.

In addition, for example, as illustrated in FIG. 20, in the case where the risk degree R is greater than "0" and control up to the risk level LV=1 is allowed for the oncoming moving body O, the traveling_ECU 14*m* prohibits an output of warnings for informing the driver of the presence of the oncoming moving body O.

Moreover, in the case where the risk degree R is greater than "0" and control up to the risk level LV=1 is allowed for the oncoming moving body O, the traveling_ECU 14*m* permits, for example, first acceleration suppression control instead of brake control as avoidance control in the vertical direction (longitudinal direction of the vehicle M) for the oncoming moving body O. In the first acceleration suppression control, for example, a first acceleration suppression amount is appropriately set only when the vehicle M is accelerating (including the case where the vehicle M is about to accelerate). The first acceleration suppression amount is set so that the smaller the vertical collision predicted time TTCz becomes, the larger the first acceleration suppression amount becomes, based on the preset map or the like.

Furthermore, in the case where the risk degree R is greater than "0" and control up to risk level LV=1 is allowed for the oncoming moving body O, the traveling_ECU 14*m* permits steering control within a range not deviating from the traveling lane where the vehicle M travels, for example, as avoidance control in the horizontal direction (vehicle width direction of the vehicle M) for the oncoming moving body O. In the steering control, the amount of avoidance by steering is set as appropriate. The amount of avoidance is set so that the smaller the lateral collision predicted time TTCx becomes, the larger the amount of avoidance becomes, based on the preset map or the like. Note that it is desirable that the speed of steering the steering wheel allowed for the steering control be limited to, for example, about 10 deg/s.

Meanwhile, for example, as illustrated in FIG. 20, in the case where the risk degree R is greater than "2" and control up to the risk level LV=2 is allowed for the oncoming moving body O, the traveling_ECU 14*m* sets an alarm or the like for informing the driver of the presence of the oncoming moving body O.

In addition, when the risk degree R is greater than "2" and control up to risk level LV=2 is allowed for the oncoming moving body O, the traveling_ECU 14*m* permits second acceleration suppression control instead of brake control as avoidance control in the longitudinal direction for the oncoming moving body O. In the second acceleration suppression control, for example, a second acceleration suppression amount is appropriately set only when the vehicle M is accelerating (including the case where the vehicle M is about to accelerate). The second acceleration suppression amount is set so that the smaller the vertical collision predicted time TTCz becomes, the larger the second acceleration suppression amount becomes, based on the preset map or the like. Note that the second acceleration suppression amount is set to be greater than the first acceleration suppression amount. For example, the second acceleration suppression amount is provided with, as the upper limit, a deceleration (suppression amount) obtained when the driver turns off the accelerator.

Moreover, in the case where the risk degree R is greater than "2" and control up to the risk level LV=2 is allowed for the oncoming moving body O, the traveling_ECU 14*m* permits steering control up to a position at which the vehicle M strides over a lane section line, for example, as avoidance control in the lateral direction for the oncoming moving body O. In the steering control, the amount of avoidance by steering is set as appropriate. The amount of avoidance is set so that the smaller the lateral collision predicted time TTCx becomes, the larger the amount of avoidance becomes, based on the preset map or the like. Note that it is desirable that the speed of steering the steering wheel allowed for the steering control be limited to, for example, about 80 deg/s.

Meanwhile, for example, as illustrated in FIG. 20, in the case where the risk degree R is greater than "4" and control up to the risk level LV=3 is allowed for the oncoming moving body O, the traveling_ECU 14*m* sets an alarm or the like for informing the driver of the presence of the oncoming moving body O.

Moreover, in the case where the risk degree R is greater than "4" and control up to the risk level LV=3 is allowed for the oncoming moving body O, the traveling_ECU 14*m* permits brake control as avoidance control in the vertical direction for the oncoming moving body O. In the brake control, for example, the amount of braking is set as appropriate. The amount of braking is set so that the smaller the vertical collision predicted time TTCz becomes, the larger the amount of braking becomes, based on the preset map or the like. Note that it is desirable that the amount of braking be set within the limit of, for example, a first target deceleration a1 (for example, 0.4 G) in the emergency collision avoidance control described above.

Moreover, in the case where the risk degree R is greater than "4" and control up to the risk level LV=3 is allowed for the oncoming moving body O, the traveling_ECU 14*m* permits, for example, steering control up to a position at which the vehicle M crosses a lane section line as avoidance control in the lateral direction for the oncoming moving body O. In the steering control, for example, the amount of avoidance by steering is set as appropriate. The amount of avoidance is set so that the smaller the lateral collision predicted time TTCx becomes, the larger the amount of avoidance becomes, based on the preset map or the like. Note that it is desirable that the speed of steering the steering wheel allowed for the steering control be limited to, for example, about 180 deg/s.

Proceeding from step S107 to step S108, the traveling_ECU 14*m* checks whether control intervention for the oncoming moving body O is necessary, that is, whether a certain control amount has been set in step S107 described above.

In the case where it is determined in step S108 that control intervention is unnecessary (NO in step S108), the traveling_ECU 14$m$ exits the subroutine as it is.

In contrast, in the case where it is determined in step S108 that control intervention is necessary (YES in step S108), the traveling_ECU 14$m$ proceeds to step S109.

In step S109, the traveling_ECU 14$m$ checks whether the oncoming moving body O has entered the target progress area Am of the vehicle M.

In the case where it is determined in step S109 that the oncoming moving body O is not present in the target progress area Am of the vehicle M (NO in step S109), the traveling_ECU 14$m$ proceeds to step S110.

In step S110, the traveling_ECU 14$m$ executes preliminary collision avoidance control, and then exits the routine. That is, the traveling_ECU 14$m$ executes preliminary collision avoidance control based on the control amount set in step S107.

In contrast, in the case where it is determined in step S109 that the oncoming moving body O is present in the target progress area Am of the vehicle M (YES in step S109), the traveling_ECU 14$m$ proceeds to step S111.

In step S111, the traveling_ECU 14$m$ changes control for the oncoming moving body O from preliminary collision avoidance control to emergency collision avoidance control, and then exits the routine.

According to the above-described embodiment, the traveling_ECU 140 of the oncoming moving body O calculates the risk degree R of a risk of the oncoming moving body O on a surrounding vehicle based on at least one of the history of the behavior of the oncoming moving body O with respect to a section line dividing the oncoming lane, or the behavior of the driver who is driving the oncoming moving body O, and emits light with a light emission pattern set in advance according to the risk degree R from the light source units 38 toward the surroundings. In contrast, the traveling_ECU 14$m$ of the vehicle M obtains the risk degree R of the oncoming moving body O based on the light emission pattern of the light source units 38. In addition, the traveling_ECU 14$m$ recognizes the oncoming moving body O as an obstacle according to the risk degree R, and performs preliminary collision avoidance control prior to emergency collision avoidance control for the oncoming moving body O recognized as an obstacle.

In doing so, even if the oncoming moving body O such as an oncoming vehicle suddenly enters the traveling lane of the vehicle M, sufficient safety can be secured. That is, the traveling_ECU 14$m$ performs preliminary collision avoidance control according to the risk degree R for the oncoming moving body O before the oncoming moving body O enters the target progress area Am of the vehicle M. Therefore, even if the oncoming moving body O crosses the lane section line and suddenly enters in front of the vehicle M, emergency collision avoidance control can be performed well in advance.

In addition, the risk degree R for the oncoming moving body O is obtained based on the light emission pattern of the light source units 38 provided in the oncoming moving body O. Therefore, the traveling_ECU 14$m$ can accurately recognize the oncoming moving body O having a high risk degree R. That is, for example, in the case where multiple oncoming moving bodies O are traveling in a row on the oncoming lane, if the vehicle M is configured to receive the risk degree R of each oncoming moving body O by wireless communication, it is assumed that it is difficult to accurately associate each oncoming moving body O and each risk degree R. In contrast, in the present embodiment, because the risk degree R is obtained based on the light emission pattern of the light source units 38 provided in each oncoming moving body O, each oncoming moving body O and each risk degree R can be accurately associated with each other.

Moreover, by adopting a configuration of transmitting the risk degree R using the light source units 38, a configuration that informs a surrounding vehicle or the like of the risk degree R can be easily applied even to a vehicle not equipped with a wireless communication function. In addition, the configuration of the light source units 38 and the like can be easily mounted on a vehicle by retrofitting or the like.

In addition, by adopting a configuration that reports the risk degree R using the light emission pattern of the light source units 38, information can be stably transmitted even in a situation where wireless communication is unstable due to radio wave interference or the like.

Furthermore, by transmitting information using a light emission pattern, there is no concern about data falsification as in wireless communication, and this is superior in terms of security compared to wireless communication and the like.

In this case, the risk degree R is calculated outside the vehicle M. That is, the risk degree R is calculated by the traveling_ECU 140 of the oncoming moving body O, which is another vehicle. Therefore, the risk degree R due to the behavior of the oncoming moving body O or the behavior of the driver who is driving the oncoming moving body O that is difficult to recognize with the stereo cameras 11, i.e., autonomous sensors of the vehicle M, can be accurately determined.

In addition, the traveling_ECU 140 calculates the risk degree intermediate values Rt$-2$, Rt$-1$, and Rt for the oncoming moving body O at the time points t$-2$, t$-1$, and t based on the history of the lateral positions with respect to the section lines calculated in each preset section (such as every past T seconds). Then, the traveling_ECU 140 calculates the sum of the risk degree intermediate values Rt$-2$, Rt$-1$, and Rt as the risk value R. In doing so, the risk degree R due to the behavior such as the wobbling of the oncoming moving body O can be accurately calculated.

At that time, the traveling_ECU 140 calculates the lateral positions a and b of the oncoming moving body O with respect to the left and right section lines dividing the oncoming lane. Then, the traveling_ECU 140 calculates the risk degree intermediate values Rt$-2$, Rt$-1$, and Rt at the time points t$-2$, t$-1$, and t based on the difference $\Delta x$ between the average values a_ave and b_ave of the lateral positions a and b with respect to the section lines calculated in each preset section. Therefore, regardless of the size of the oncoming moving body O, the wobbling of the oncoming moving body O with respect to the center of the oncoming lane can be accurately recognized.

In addition, the traveling_ECU 14$m$ applies upper limit processing to the risk degree R. In doing so, execution of unnecessary preliminary collision avoidance control can be suppressed.

In addition, the traveling_ECU 14$m$ makes the control level (risk level) allowed for the preliminary collision avoidance control different according to the value of the vertical collision predicted time TTCz. In doing so, preliminary collision avoidance control that is appropriate for the oncoming moving body O can be realized.

Here, in the above-described embodiment, the image recognition_ECU 13, the traveling_ECU 14, the CP_ECU 21, the E/G_ECU 22, the T/M_ECU 23, the BK_ECU 24, the PS_ECU 25, and the like are formed of a conventional microcomputer or processor including a central processing unit (CPU), random-access memory (RAM), read-only memory (ROM), and a non-volatile storage unit, and a peripheral device thereof. The ROM stores in advance programs executed by the CPU and fixed data such as data tables. Note that all or some of the functions of the processor may be configured by a logic circuit or an analog circuit. Moreover, the processing of various programs may be realized by an electronic circuit such as a field-program-mable gate array (FPGA).

In the above-described embodiment, the vehicle M and the oncoming moving body O are relative objects that change depending on a vehicle that serves as a reference. Therefore, in the description, the "vehicle M" can be read as the "oncoming moving body O", and also the "oncoming moving body O" can be read as the "vehicle M".

The disclosure described in the above embodiment is not limited to forms thereof, and various other modifications can be made at the implementation stage within a range not deviating from the gist thereof. Furthermore, the above-described embodiment includes various stages of the disclosure, and they can be extracted by appropriate combinations of constituent features disclosed herein.

For example, an infrastructure facility (roadside unit or the like) provided at each set interval along the road can be equipped with functions as a lateral position calculator, a risk degree calculator, and a transmitter. In this case, the infrastructure facility includes, for example, a configuration corresponding to the camera unit 10.

Moreover, even if some constituent features are deleted from all the constituent features indicated in the above-described embodiment, if the described problem can be solved and the stated effect can be obtained, the configuration from which the constituent features have been removed can be extracted as a stage of the disclosure.

The image recognition_ECU 13 and the traveling_ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the image recognition_ECU 13 and the traveling_ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A drive assist apparatus for a vehicle, the drive assist apparatus comprising one or more processors, and one or more memories storing instructions that, when executed, cause the one or more processors to:

identify a light emission pattern of a light source unit provided in an oncoming moving body, the oncoming moving body moving with a velocity component in a direction opposite to a traveling direction of the vehicle, on an oncoming lane adjoining a traveling lane of the vehicle, the light emission pattern being associated with a risk degree of the oncoming moving body on the vehicle and being calculated by the oncoming moving body;

identify the risk degree for the oncoming moving body based on the identified light emission pattern;

in response to the identified risk degree being less than a first predetermined risk degree threshold, (i) determine that the oncoming moving body is an obstacle that likely to come into collision with the vehicle, and (ii) perform a preliminary collision avoidance control for suppressing a risk of the collision; and in response to the identified risk degree being higher than a second predetermined risk degree threshold, (i) determine that the vehicle is highly likely to come into collision with the obstacle, and (ii) perform an emergency collision avoidance control for avoiding the collision, the second predetermined risk degree threshold being equal to or higher than the first predetermined risk degree threshold.

2. The drive assist apparatus for the vehicle of claim 1, wherein the one or more processors are further configured to:

determine whether the oncoming moving body has entered a target progress area of the vehicle; and in response to determining that the oncoming moving body has entered a target progress area of the vehicle, execute the emergency collision avoidance control.

3. The drive assist apparatus for the vehicle of claim 1, wherein the one or more processors are further configured to:

determine whether the oncoming moving body has entered a target progress area of the vehicle; and in response to determining that the oncoming moving body has not entered a target progress area of the vehicle, execute the preliminary collision avoidance control.

4. A drive assist apparatus for a vehicle, the drive assist apparatus comprising:

one or more processors;

one or more memories storing instructions that, when executed, cause the one or more processors to:

calculate a risk degree of the vehicle on a surrounding vehicle based on one or both of a history of a behavior of the vehicle with respect to a section line dividing a traveling lane of the vehicle and a behavior of a driver who is driving the vehicle; and determine a corresponding light emission pattern based on the calculated risk degree; and a light source unit including a light source and configured to emit light toward surroundings of the vehicle with the determined light emission pattern.

5. The drive assist apparatus for the vehicle of claim 4, wherein the one or more processors are configured to correct the risk degree based on the behavior of the driver.

6. The drive assist apparatus for the vehicle of claim 4, wherein the behavior of the driver comprises at least one of alertness, accelerator operation, brake operation, steering operation, or abnormal operation inconsistent with a traffic rule of the driver.

7. The drive assist apparatus for the vehicle of claim 4, wherein the one or more processors are configured to calculate a risk degree intermediate value for the vehicle based on a history of a lateral position with respect to the section line in each preset section, and to calculate a sum of the risk degree intermediate values as the risk degree.

8. A drive assist apparatus for a vehicle, the drive assist apparatus comprising:

one or more processors; and one or more memories storing instructions that, when executed, cause the one or more processors to:

calculate a risk degree of the vehicle on a surrounding vehicle based on one or both of a history of a behavior of the vehicle with respect to a section line dividing a traveling lane of the vehicle and a behavior of a driver who is driving the vehicle; and determine a corresponding light emission pattern of the vehicle based on the calculated risk degree of the vehicle; and a light source unit including a light source and configured to emit light toward surroundings of the vehicle with the determined light emission pattern of the vehicle, wherein the instructions are configured to cause the one or more processors further to:

identify a light emission pattern of a light source unit provided in an oncoming moving body, the oncoming moving body moving with a velocity component in a direction opposite to a traveling direction of the vehicle, on an oncoming lane adjoining the traveling lane of the vehicle, the light emission pattern of the oncoming moving body being associated with a risk degree of the oncoming moving body on the vehicle and being calculated by the oncoming moving body;

identify the risk degree for the oncoming moving body based on the identified light emission pattern;

in response to the identified risk degree of the oncoming moving body being less than a first predetermined risk degree threshold, (i) determine that the oncoming moving body is an obstacle that likely to come into collision with the vehicle, and (ii) perform a preliminary collision avoidance control for suppressing a risk of the collision; and in response to the identified risk degree of the oncoming moving body being equal to higher than a second predetermined risk degree threshold, (i) determine that the vehicle is highly likely to come into collision with the obstacle, and (ii) perform an emergency collision avoidance control for avoiding the collision, the second predetermined risk degree threshold being equal to or higher than the first predetermined risk degree threshold.

9. The drive assist apparatus for the vehicle of claim 8, wherein the one or more processors are further configured to:

determine whether the oncoming moving body has entered a target progress area of the vehicle; and in response to determining that the oncoming moving body has entered a target progress area of the vehicle, execute the emergency collision avoidance control.

10. The drive assist apparatus for the vehicle of claim 8, wherein the one or more processors are further configured to:

determine whether the oncoming moving body has entered a target progress area of the vehicle; and in response to determining that the oncoming moving body has not entered a target progress area of the vehicle, execute the preliminary collision avoidance control.

11. The drive assist apparatus for the vehicle of claim 8, wherein the one or more processors are configured to correct the risk degree based on the behavior of the driver.

12. The drive assist apparatus for the vehicle of claim 8, wherein the behavior of the driver comprises at least one of alertness, accelerator operation, brake operation, steering operation, or abnormal operation inconsistent with a traffic rule of the driver.

13. The drive assist apparatus for the vehicle of claim 8, wherein the one or more processors are configured to calculate a risk degree intermediate value for the vehicle based on a history of a lateral position with respect to the section line in each preset section, and to calculate a sum of the risk degree intermediate values as the risk degree.

14. A drive assist system for a vehicle, the drive assist system comprising:

a first circuitry provided in an oncoming moving body that moves with a velocity component in a direction opposite to a traveling direction of the vehicle on an oncoming lane adjoining a traveling lane of the vehicle and configured to:

calculate a risk degree of the oncoming moving body on a surrounding vehicle based on one or both of a history of a behavior of the oncoming moving body with respect to a section line dividing the oncoming lane and a behavior of a driver who is driving the oncoming moving body; and determine a corresponding light emission pattern of the oncoming moving body based on the calculated risk degree; and a light source unit provided in the oncoming moving body and configured to emit light toward surroundings of the oncoming moving body with the determined light emission pattern of the oncoming moving body;

a second circuitry provided in the vehicle and configured to:

identify the light emission pattern of the light source unit of the oncoming moving body;

identify the risk degree for the oncoming moving body based on the identified light emission pattern of the oncoming moving body;

in response to the identified risk degree of the oncoming moving body being less than a first predetermined risk degree threshold, (i) determine that the oncoming moving body is an obstacle that likely to come into collision with the vehicle, and (ii) perform a preliminary collision avoidance control for suppressing a risk of the collision; and in response to the identified risk degree of the oncoming moving body being higher than a second predetermined risk degree threshold, (i) determine that the vehicle is likely to collide with the obstacle, and (ii) perform an emergency collision avoidance control for avoiding the collision, the second predetermined risk degree threshold being equal to or higher than the first predetermined risk degree threshold.

15. The drive assist system for the vehicle, according to claim 14, wherein the first circuitry is configured to calculate a risk degree intermediate value for the oncoming moving body based on a history of a lateral position with respect to the section line in each preset section, and to calculate a sum of the risk degree intermediate values as the risk degree.

16. The drive assist system for the vehicle of claim 14, wherein the second circuitry is further configured to:

determine whether the oncoming moving body has entered a target progress area of the vehicle; and in response to determining that the oncoming moving body has entered a target progress area of the vehicle, execute the emergency collision avoidance control.

17. The drive assist system for the vehicle of claim 14, wherein the second circuitry is further configured to:

determine whether the oncoming moving body has entered a target progress area of the vehicle; and in response to determining that the oncoming moving body has not entered a target progress area of the vehicle, execute the preliminary collision avoidance control.

18. The drive assist system for the vehicle of claim 14, wherein the first circuitry is further configured to correct the risk degree based on the behavior of the driver.

19. The drive assist system for the vehicle of claim 14, wherein the behavior of the driver comprises at least one of alertness, accelerator operation, brake operation, steering operation, or abnormal operation inconsistent with a traffic rule of the driver.

\* \* \* \* \*